US008994975B2

(12) United States Patent
Ono

(10) Patent No.: US 8,994,975 B2
(45) Date of Patent: Mar. 31, 2015

(54) INFORMATION PROCESSING APPARATUS, OUTPUT SYSTEM AND NON-TRANSITORY COMPUTER READABLE INFORMATION RECORDING MEDIUM

(71) Applicant: Yohei Ono, Kanagawa (JP)

(72) Inventor: Yohei Ono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/017,400

(22) Filed: Sep. 4, 2013

(65) Prior Publication Data

US 2014/0078527 A1 Mar. 20, 2014

(30) Foreign Application Priority Data

Sep. 18, 2012 (JP) ................................ 2012-204048

(51) Int. Cl.
*H04N 1/40* (2006.01)
*G06K 15/02* (2006.01)
*G06K 15/00* (2006.01)
*G06F 3/12* (2006.01)

(52) U.S. Cl.
CPC .......... *G06K 15/1848* (2013.01); *G06K 15/002* (2013.01); *G06K 15/005* (2013.01); *G06K 15/1822* (2013.01); *G06K 15/1806* (2013.01); *G06F 3/1211* (2013.01); *G06F 3/1256* (2013.01); *G06F 3/1273* (2013.01); *G06F 3/1288* (2013.01); *G06F 3/1292* (2013.01)
USPC ......................................... 358/1.13; 358/527

(58) Field of Classification Search
CPC ............ H04N 1/0044; H04N 5/23293; H04N 1/00482; H04N 2201/0094; H04N 1/00474; H04N 1/00408; G06F 3/1256; G06F 3/1205; G06F 3/1253; G06F 3/1203
USPC ........... 358/527, 1.9, 2.1, 500, 504, 400, 406, 358/1.15, 1.13
See application file for complete search history.

(56) References Cited

U.S. PATENT DOCUMENTS

| 6,587,596 | B1 * | 7/2003 | Haeberli ........................ 382/283 |
| 7,884,981 | B2 * | 2/2011 | Mishima et al. .............. 358/527 |
| 8,125,683 | B2 * | 2/2012 | Miyazawa et al. ............. 358/1.9 |
| 2006/0066899 | A1 | 3/2006 | Yoshida |
| 2010/0182661 | A1 | 7/2010 | Imayoshi |

FOREIGN PATENT DOCUMENTS

| JP | 2006-127478 | 5/2006 |
| JP | 2010-166385 | 7/2010 |

* cited by examiner

*Primary Examiner* — Thomas D Lee
*Assistant Examiner* — Stephen M Brinich
(74) *Attorney, Agent, or Firm* — IPUSA, PLLC

(57) ABSTRACT

An information processing apparatus includes an analysis part that analyzes a set of output data that has been input to obtain an attribute value of an output attribute; a determination part that determines whether to generate a preview image of the set of output data, based on the attribute value of the output attribute of the set of output data and history information that associates attribute values of the output attribute of sets of output data with information concerning preview displays of the sets of output data; and a preview image generation part that generates, based on the determination result of the determination part to generate the preview image of the set of output data, the preview image of the set of output data, and stores the generated preview image in a storage part.

18 Claims, 22 Drawing Sheets

FIG.7A

| EXECUTION DATE/TIME | NUMBER OF PAGES | N-in-1 | ... | PREVIEW DISPLAY |
|---|---|---|---|---|
| 2012/02/01 | 5 | 2in1 | ... | ○ |
|  | 10 | NO N-in-1 | ... | × |
|  | 6 | 4in1 | ... | ○ |
|  | 1 | NO N-in-1 | ... | × |
| 2012/02/02 | 30 | 2in1 | ... | ○ |

FIG.7B

| PRINT ATTRIBUTE | ATTRIBUTE VALUE | NUMBER OF TIMES OF PRINTING | NUMBER OF TIMES OF PREVIEW DISPLAYS | RATIO (%) OF PREVIEW DISPLAYS |
|---|---|---|---|---|
| NUMBER OF PAGES | ~10 | 20 | 1 | 5 |
| | 11~50 | 20 | 5 | 25 |
| | 51~100 | 10 | 5 | 50 |
| | 101~ | 5 | 1 | 20 |
| N-in-1 | NO N-in-1 | 20 | 1 | 5 |
| | 2in1 | 20 | 5 | 25 |
| | 4in1 | 10 | 5 | 50 |
| | GREATER THAN OR EQUAL TO 6in1 | 5 | 3 | 60 |
| ... | ... | ... | ... | ... |

FIG.8

PLEASE SET "METHOD TO STORE PREVIEW DISPLAY HISTORY" AND "THRESHOLD TO GENERATE PREVIEW IMAGE"

| NUMBER OF PAGES SETTING | THRESHOLD |
|---|---|
| ○ NOT USE | |
| ● USE | |
| ■ ~10 P | 80 % |
| ■ 11~50 P | 70 % |
| ■ 51~100 P | 60 % |
| ■ 101 P~ | 50 % |

| | N-in-1 SETTING | THRESHOLD |
|---|---|---|
| | ○ NOT USE | |
| | ● USE | |
| ■ | NO N-in-1 | 60 % |
| ■ | 2in1 | 30 % |
| ■ | 4in1 | 0 % |
| □ | 6in1 | 0 % |

1001

PLEASE SET NUMBER OF DAYS TO STORE PREVIEW DISPLAY HISTORY

7 DAYS

OK    CANCEL

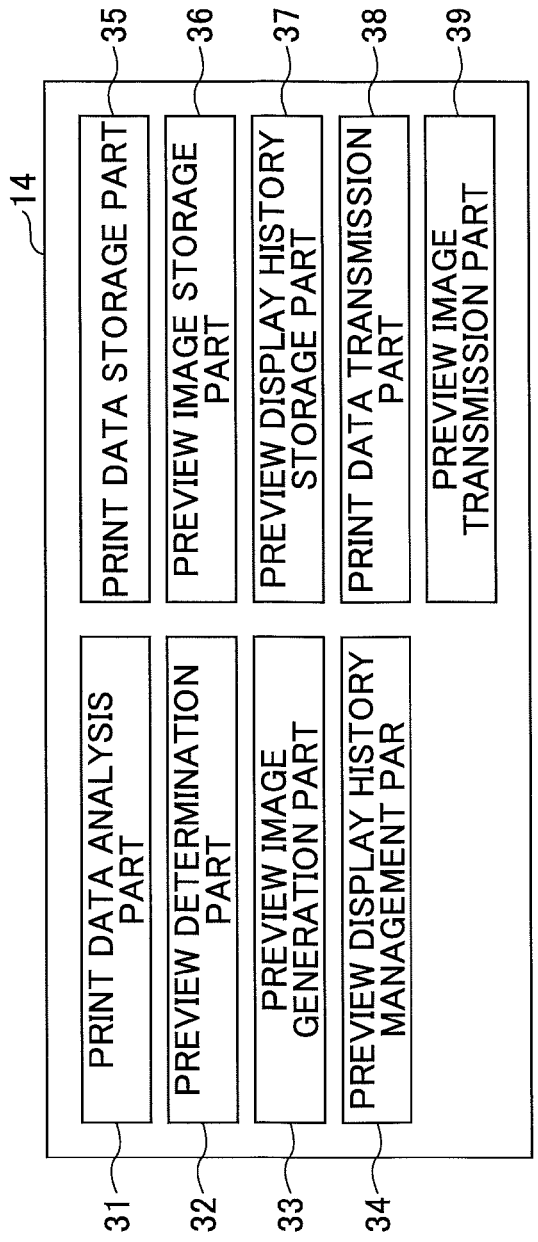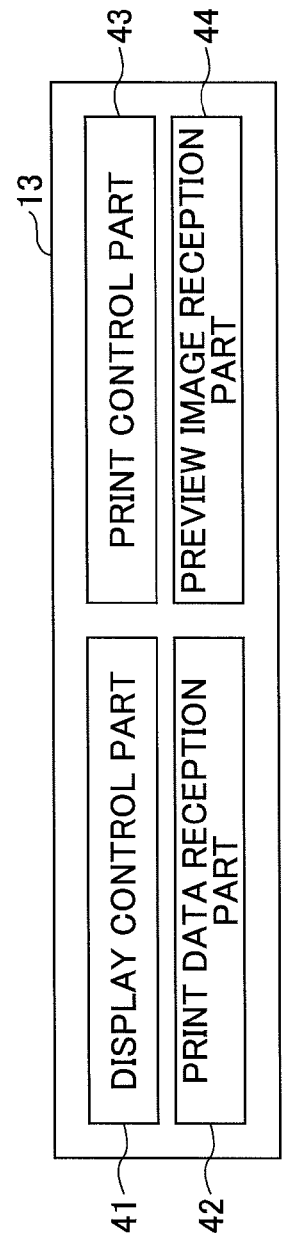

FIG.20

| JOB ID | COMPANY CODE | USER IDENTIFICATION INFORMATION | BIBLIOGRAPHIC INFORMATION (TITLE AND SO FORTH) |
|---|---|---|---|
| 1 | XXX | User A | ⋮ |
| 2 | XXX | User B | ⋮ |
| 3 | XXX | User A | ⋮ |
| 4 | YYY | User A | ⋮ |

FIG.21

| JOB ID | PREVIEW DATA ID |
|---|---|
| 1 | 1 |
| 3 | 2 |

FIG.22A

| COMPANY INFORMATION | COMPANY CODE | USER IDENTIFICATION INFORMATION | PASSWORD | ADDRESS INFORMATION | OUTPUT SETTING | ... |
|---|---|---|---|---|---|---|
| COMPANY A | XXX | User A | AAA | A@aaa.com | DUPLEX & COLOR | |
| | | User B | BBB | B@aaa.com | SIMPLEX & COLOR | |
| | | User C | CCC | C@aaa.com | DUPLEX & MONOCHROME | |
| COMPANY B | YYY | User A | AAA | A@bbb.com | SIMPLEX & 4in1 | |
| | | User D | DDD | D@bbb.com | DUPLEX & 2in1 | |

FIG.22B

| COMPANY CODE | DEVICE INFORMATION |
|---|---|
| XXX | 111 |
| | 222 |
| | 333 |

| COMPANY CODE | DEVICE INFORMATION |
|---|---|
| YYY | 444 |
| | 444 |
| | 444 |

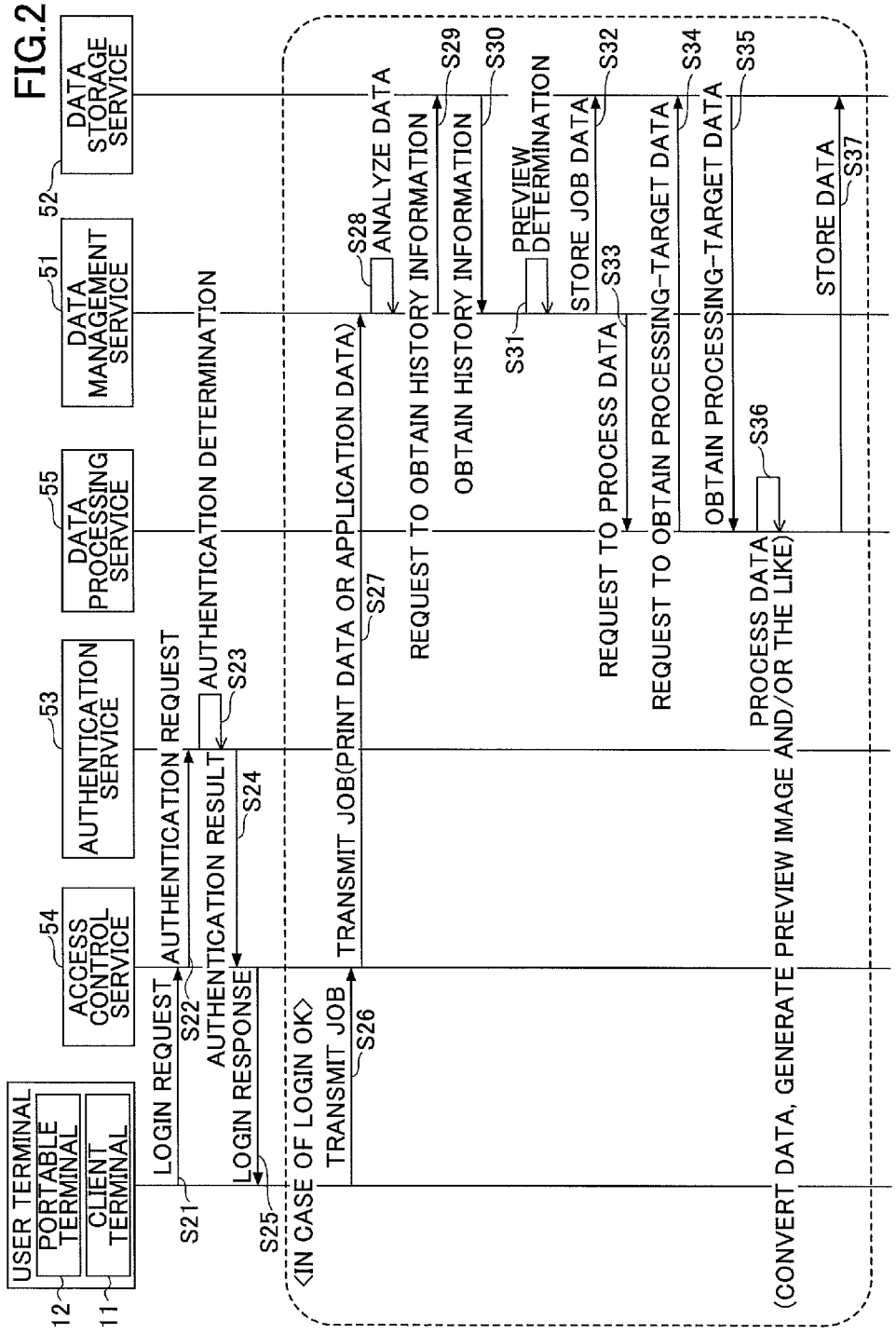

INFORMATION PROCESSING APPARATUS, OUTPUT SYSTEM AND NON-TRANSITORY COMPUTER READABLE INFORMATION RECORDING MEDIUM

BACKGROUND OF THE INVENTION

1. Field of the Invention

The present invention relates to an information processing apparatus, an output system and a non-transitory computer readable information recording medium.

2. Description of the Related Art

An image forming apparatus is known that automatically carries out a preview display of original image data before printing, in a case where printing conditions that were previously set have been currently set by a user (for example, see Japanese Laid-Open Patent Application No. 2010-166385).

However, in such an image forming apparatus in the related art, the processing load of generating a preview image may be heavy depending on the contents of print data, and a long time may be taken for completing the preview display. Such a problem may also occur in an image forming apparatus in which conditions for print data for which a preview display is to be carried out are previously set, and in which a preview display is carried out for print data that satisfies the conditions.

SUMMARY OF THE INVENTION

According to one embodiment of the present invention, an information processing apparatus includes an analysis part that analyzes a set of output data that has been input to obtain an output attribute; a determination part that determines whether to generate a preview image of the set of output data, based on the output attribute of the set of output data and history information that associates output attributes of sets of output data with information concerning preview displays of the sets of output data; and a preview image generation part that generates, based on the determination result of the determination part to generate the preview image of the set of output data, the preview image of the set of output data, and stores the generated preview image in a storage part.

Other objects, features and advantages of the present invention will become more apparent from the following detailed description when read in conjunction with the accompanying drawings.

BRIEF DESCRIPTION OF THE DRAWINGS

FIGS. 7A and 7B are configuration diagrams that illustrate one example of a history indicating whether a preview display has been carried out, stored by a preview display history storage part;

FIG. 8 is an image diagram that illustrates one example of a setting screen page for a user to carry out setting concerning a preview display history storage part;

FIG. 10 is a process block diagram that illustrates one example of a management server according to the second embodiment;

FIG. 11 is a process block diagram that illustrates one example of an image forming apparatus according to the second embodiment;

FIG. 20 is a configuration diagram that illustrates one example of job information;

FIG. 21 is a configuration diagram that illustrates one example of preview data information;

FIGS. 22A and 22B are configuration diagrams that illustrate one example of management data;

FIG. 23 is a sequence diagram in one example showing a job input process;

DETAILED DESCRIPTION OF THE EMBODIMENTS

Next, illustrative embodiments of the present invention will be described.

First Embodiment

<System Configuration>

Figure 1:
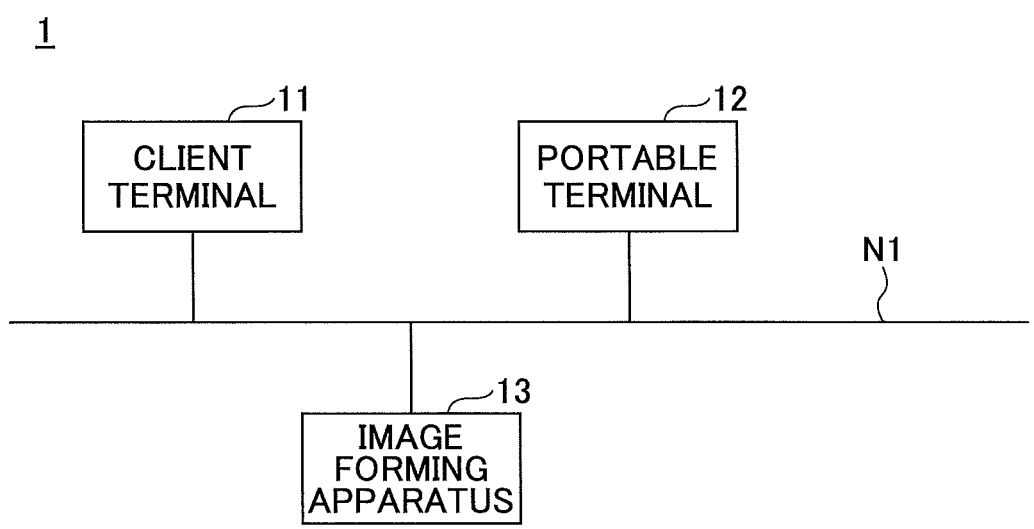
FIG. 1 is a configuration diagram that illustrates one example of a printing system according to a first embodiment.

FIG. 1 is a configuration diagram of one example of a printing system 1 according to the first embodiment. The printing system 1 of FIG. 1 is one example in which a client terminal 11, a portable terminal 12 and an image forming apparatus 13 are connected with a network N1 such as the Internet, a Local Area Network (LAN) or the like. Note that although the client terminal 1, the portable terminal 12 and the image forming apparatus 13 are illustrated as single apparatuses in FIG. 1, the printing system 1 may include one or more of the client terminals 11, one or more of the portable terminals 12 and one or more of the image forming apparatuses 13.

The client terminal 11 is one example of a terminal apparatus. The client terminal 11 may be realized by an information processing apparatus (computer system) in which a general Operating System (OS) is mounted. The client terminal 11 includes a wireless or wired communication device. The client terminal 11 is a terminal that a user can operate, such as a tablet Personal Computer (PC), a notebook-size PC, or the like.

The portable terminal 12 is one example of a terminal apparatus. The portable terminal 12 has a wireless or wired communication device. The portable terminal 12 is a terminal that a user can carry, such as a smartphone, a portable phone, a tablet PC, a notebook-size PC, or the like.

A user inputs print data using a terminal apparatus such as the client terminal 11, the portable terminal 12 or the like into the image forming apparatus 13 via the network N1.

The image forming apparatus 13 is one example of an output apparatus. The image forming apparatus 13 has a wireless or wired communication device. The image forming apparatus 13 is an apparatus such as a multifunction peripheral, a copier, a scanner, a printer, a laser printer or the like, that carries out a process(es) concerning the formation of an image.

The image forming apparatus 13 stores print data that has been input by a user using the terminal apparatus such as the client terminal 11, the portable terminal 12 or the like. When storing print data, the image forming apparatus 13 determines whether it is necessary to generate a preview image, as will be described later. When having determined that it is necessary to generate a preview image, the image forming apparatus 13 generates a preview image, and stores it.

Note that a "preview image" is an image that shows a state as to how the print data will be printed before the print data will be actually printed.

The image forming apparatus 13 displays, on an operation panel or the like, a list of sets of print data that have been input by a user(s) who has(have) logged in to the image forming apparatus 13 so that the user(s) can select therefrom a set of print data to be printed. At this time, the user(s) can make a selection such that a preview display of the selected set of print data is to be carried out.

Note that "to carry out a preview display of (a set of) print data" means to carry out a display of a preview image of the (set of) print data.

The image forming apparatus 13 displays a preview image of the selected set of print data, in the case where a preview image of the selected set of print data has been generated at the time of storing the set of print data. On the other hand, in the case where a preview image of the selected set of print data, for which a preview display has been selected, has not been generated at the time of storing the set of print data, the image forming apparatus 13 generates a preview image of the selected set of print data, and displays the preview image.

Thus, according to the first embodiment, it is possible to increase the speed of a preview display of a set of print data for which a preview image has been previously generated, as a result of previously generating a preview image of a set of print data for which the image forming apparatus has determined that it is necessary to generate the preview image at a time of having stored the set of print data.

Note that such a determination as to whether it is necessary to previously generate a preview image is carried out in a manner shown below. That is, a history concerning attribute values of a print attribute(s) (described later) of sets of print data for which a user(s) has(have) actually made a selection(s) of carrying out preview displays is managed. Then, with reference to the thus managed history, it is determined that it is necessary to previously generate a preview image for a set of print data having an attribute value(s) of the print attribute(s) for which the frequency of having carried out preview displays is high. A specific example of such a manner will be described using FIGS. 7A, 7B and 8.

Thus, the image forming apparatus 13 can dynamically determine a set of print data for which the probability of carrying out a preview display is high, using the history of preview displays for which a user(s) has(have) actually made a selection(s). Therefore, it is possible to previously generate a preview image of a set of print data for which the probability of carrying out a preview display is high.

The image forming apparatus 13 can increase the speed of carrying out a preview display of a set of print data for which the probability of carrying out a preview image is high by previously generating the preview image of the set of print data for which the probability of carrying out a preview image is high, while avoiding previously generating a preview image of a set of print data uselessly for which the probability of carrying out a preview image is low.

<Hardware Configuration>

Figure 2:
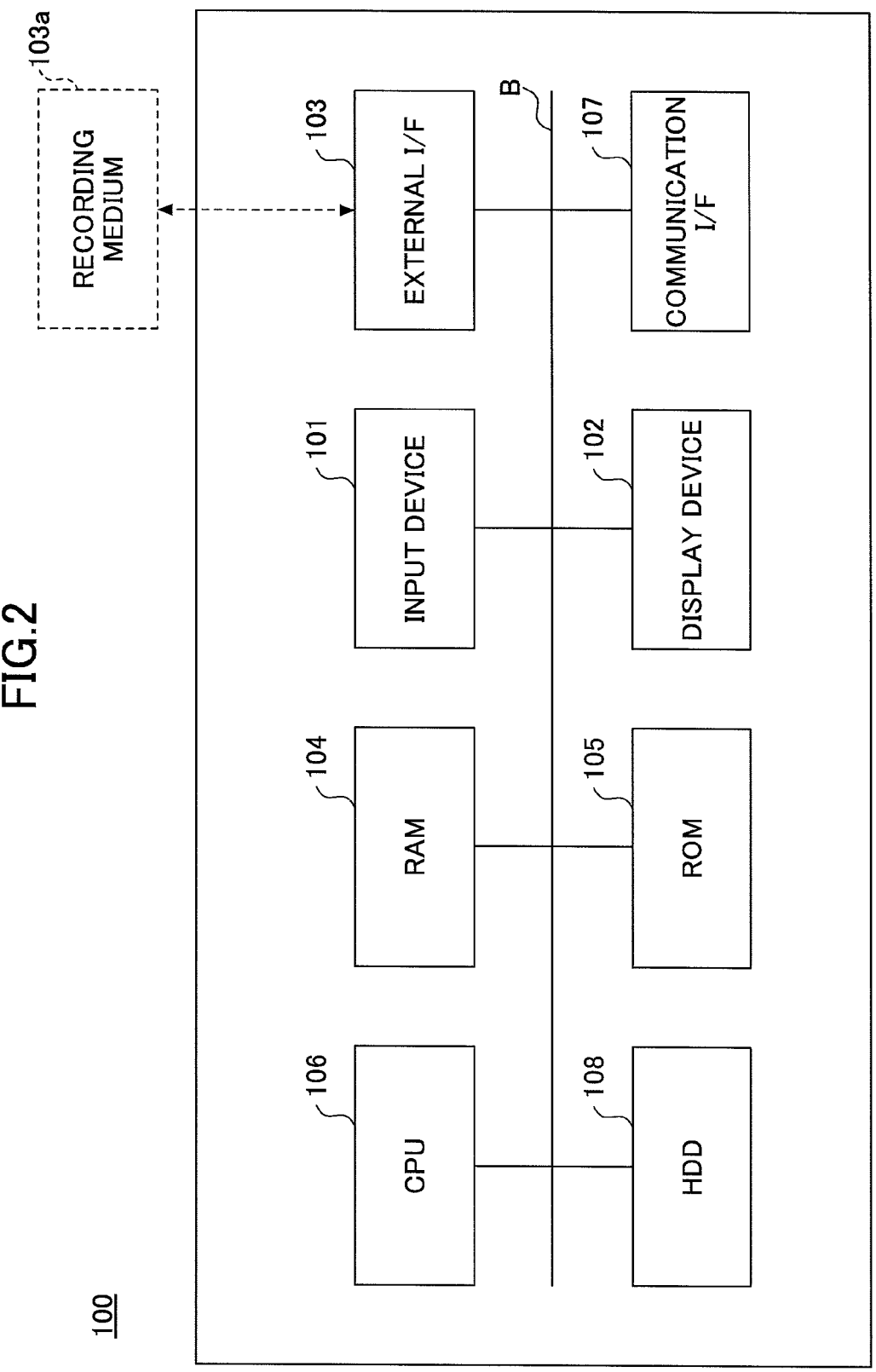
FIG. 2 is a hardware configuration diagram that illustrates one example of a computer system according to the first embodiment.

Each of the client terminal 11 and the portable terminal 12 is realized by a computer system 100 having a hardware configuration such as that shown in FIG. 2, for example. FIG. 2 shows a hardware configuration of one example of a computer system 100 according to the first embodiment.

The computer system 100 shown in FIG. 2 includes an input device 101, a display device 102, an external I/F 103, a Random Access Memory (RAM) 104, a Read-Only Memory (ROM) 105, a Central Processing Unit (CPU) 106, a communication I/F 107 and a Hard Disk Drive (HDD) 108, which are connected together via a bus B.

The input device 101 includes a keyboard, a mouse and so forth, and is used by a user to input respective operation signals. The display device 102 includes a display and/or the like, and displays a processing result of the computer system 100.

The communication I/F 107 is an interface for connecting the computer system 100 to the network N1. Thereby, the computer system 100 can carry out data communication with other apparatuses via the communication I/F 107. Note that communication to be carried out by the communication I/F 107 may be either wired communication or wireless communication.

The HDD 108 is a nonvolatile storage device storing programs and data. The programs stored by the HDD 108 include an Operating System (OS) that is basic software controlling the entirety of the computer system 100, application software providing various functions under the control of the OS, and so forth. The HDD 108 manages the stored programs and data using a predetermined file system and/or DataBase (DB).

The external I/F 103 is an interface between the computer system 100 and external devices. The external devices include a recording medium 103a and so forth. Thereby, the computer system 100 can carry out reading from and/or writing to the recording medium 103a via the external I/F 103. Note that specific examples of the recording medium 103a include a flexible disk, a Compact Disk (CD), a Digital Versatile Disk (DVD), a SD memory card, a Universal Serial Bus memory (USB memory) and so forth.

The ROM 105 is a nonvolatile semiconductor memory (storage device) and thus can store programs and/or data even after the power supply has been turned off. The ROM 105 stores programs and data such as a Basic Input/Output System (BIOS) to be executed when the computer system 100 is started up, OS settings, network settings, and so forth. The RAM 104 is a volatile semiconductor memory (storage device) and temporarily stores programs and/or data.

The CPU 106 includes an arithmetic and logic unit, reads programs and/or data from storage device(s) such as the ROM 105 and/or HDD 108 to the RAM 104, carries out processes, and thus, realizes controls and/or functions of the entirety of the computer system 100.

The client terminal 11 and the portable terminal 12 according to the first embodiment implement various processes that will be described later each using the above-mentioned hardware configuration of the computer system 100.

Figure 3:
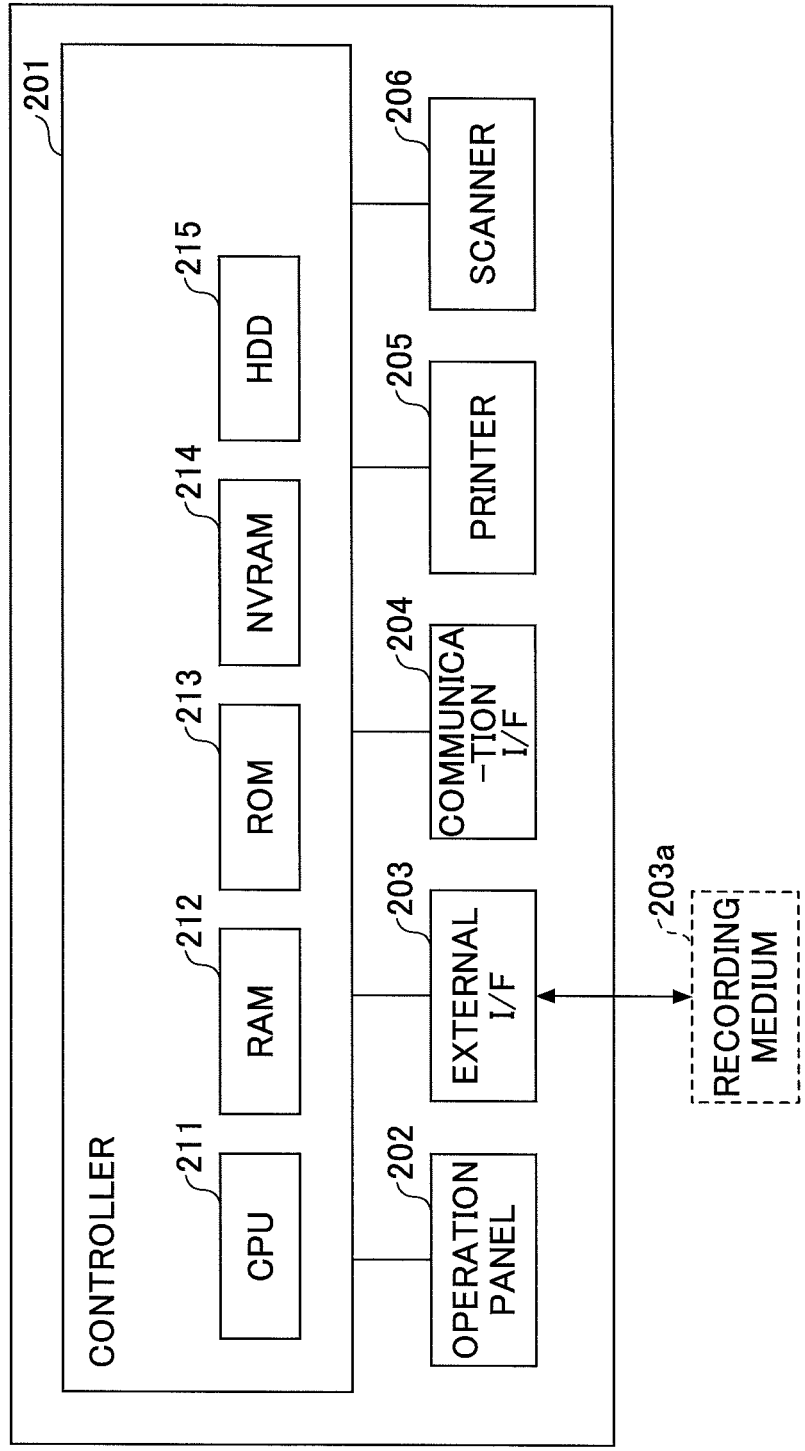
FIG. 3 is a hardware configuration diagram that illustrates one example of an image forming apparatus according to the first embodiment.

FIG. 3 is a hardware configuration diagram of one example of the image forming apparatus 13 according to the first embodiment. The image forming apparatus 13 shown in FIG. 3 includes a controller 201, the operation panel 202, an external I/F 203, a communication I/F 204, a printer 205 and a scanner 206.

The controller 201 includes a CPU 211, a RAM 212, a ROM 213, a NVRAM 214 and a HDD 215. The ROM 213 stores various programs and data. The RAM 212 temporarily stores programs and data. The NVRAM 214 stores, for example, setting information and/or the like. The HDD 215 stores various programs and data.

The CPU 211 reads programs, data, setting information and/or the like from the ROM 213, the NVRAM 214, the HDD 215 and/or the like to the RAM 212, carries out processes and thus, controls the entirety of the image forming apparatus 13 and provides the functions thereof.

The operation panel 202 includes an input part for receiving an input from a user and a display part for carrying out a display. The external I/F 203 is an interface between the image forming apparatus 13 and external devices. The external devices include a recording medium 203a and so forth. Thereby, the image forming apparatus 13 can carry out reading from and/or writing to the recording medium 203a via the external I/F 203. Note that specific examples of the recording medium 203a include an IC card, a flexible disk, a CD, a DVD, a SD memory card, a USB memory and so forth.

The communication I/F 204 is an interface for connecting the image forming apparatus 13 to the network N1. Thereby, the image forming apparatus 13 can carry out data communication with other apparatuses via the communication I/F 204. Note that communication to be carried out by the communication I/F 204 may be either wired communication or wireless communication.

The printer 205 is a printing device for printing print data onto a sheet of paper. The scanner 206 is a reading device for reading image data from an original document or the like. The image forming apparatus 13 according to the first embodiment realizes various processes, described later, using the above-mentioned hardware configuration.

<Software Configuration>

Figure 4:
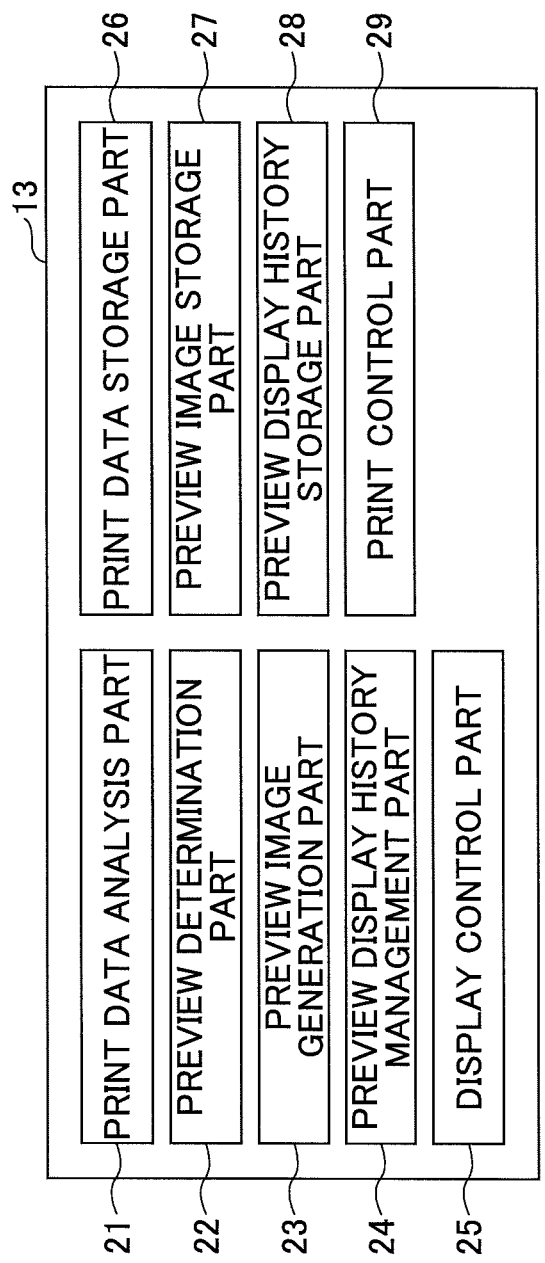
FIG. 4 is a process block diagram that illustrates one example of the image forming apparatus according to the first embodiment.

The image forming apparatus 13 according to the first embodiment is realized by process blocks such as those shown in FIG. 4, for example. FIG. 4 is a process block diagram of one example of the image forming apparatus 13 according to the first embodiment.

The image forming apparatus 13 of FIG. 4 realizes, by executing a program(s), a print data analysis part 21, a preview determination part 22, a preview image generation part 23, a preview display history management part 24, a display control part 25, a print data storage part 26, a preview image storage part 27, a preview display history storage part 28 and a print control part 29.

The print data analysis part 21 determines a print attribute(s) of print data. The preview determination part 22 determines whether it is necessary to generate a preview image, based on the print attribute(s) of the print data. The preview image generation part 23 generates a preview image of print data. The preview display history management part 24 records, in the preview display history storage part 28, a history indicating whether a preview display has been carried out, as will be described later. The preview display history management part 24 receives settings concerning the preview display history storage part 28, as will be described later.

The display control part 25 controls a screen display on the operation panel 202. The print data storage part 26 stores sets of print data. The preview image storage part 27 stores preview images. The preview display history storage part 28 stores a history indicating whether a preview display has been carried out. The print control part 29 controls printing carried out by the printer 205.

<Details of Processes>

<<Storing Print Data>>

Figure 5:
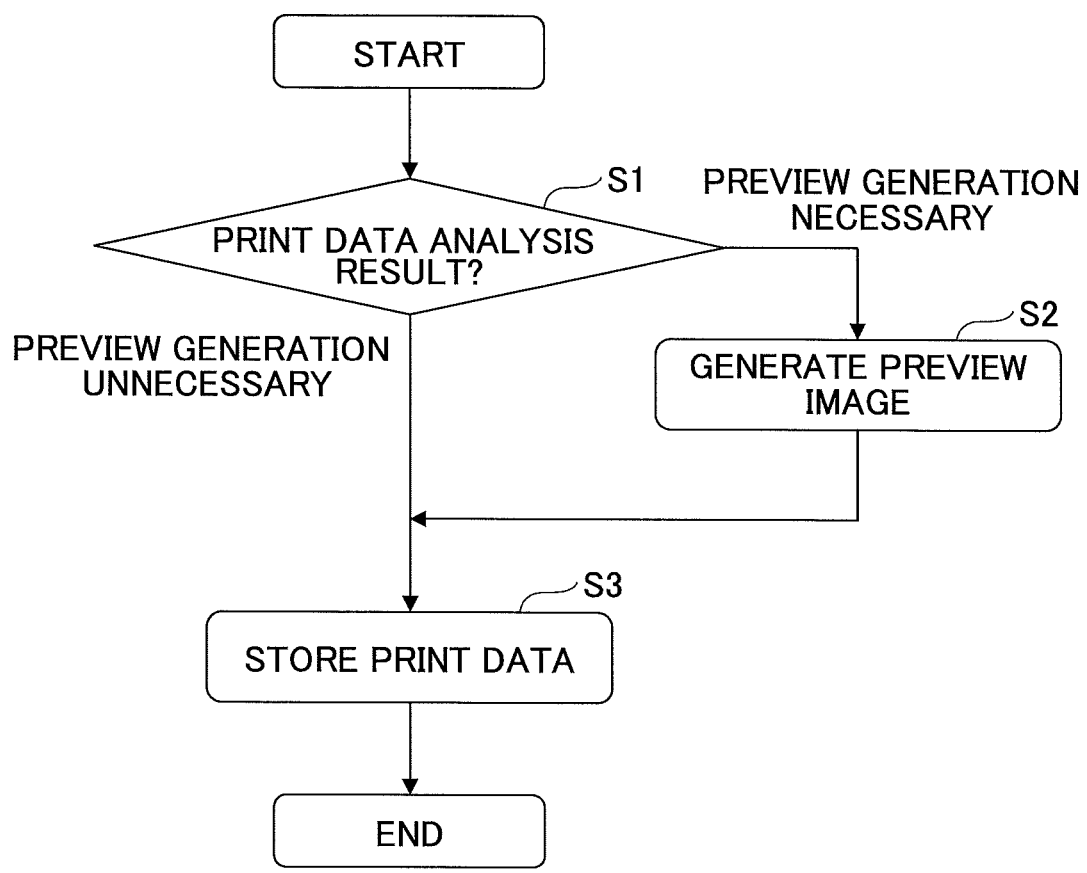
FIG. 5 is a flowchart in one example showing processes of the image forming apparatus according to the first embodiment at a time of storing print data.

Below, details of processes of the printing system 1 according to the first embodiment will be described. FIG. 5 is a flowchart of one example showing processes of the image forming apparatus 13 at a time of storing print data.

A user inputs a set of print data to the image forming apparatus 13 via the network N1 using the terminal apparatus such as the client terminal 11, the portable terminal 11 or the like, for example. When the set of print data has been thus input to the image forming apparatus 13 by the user, the image forming apparatus 13 starts the processes of the flowchart of FIG. 5.

In step S1, the print data analysis part 21 of the image forming apparatus 13 determines the print attribute (actually, an attribute value thereof, as will be described later) of the set of print data that has been input by the user. The preview determination part 22 determiners, based on the print attribute of the set of print data, whether it is necessary to generate a preview image of the set of print data. Details of the determination carried out by the preview determination part 22 as to whether it is necessary to generate a preview image will be described later.

When the preview determination part 22 has determined that it is necessary to generate a preview image, the process proceeds to step S2, and the preview image generation part 23 generates a preview image of the set of print data, the generation of the preview image having been thus determined as necessary. The preview image storage part 27 stores the preview image thus generated by the preview image generation part 23.

Then, in step S3, the print data storage part 26 stores the set of print data that has been input by the user. Note that when it has been determined in step S1 that it is not necessary to generate a preview image, step S2 is skipped, the process directly proceeds to step S3, and the print data storage part 26 stores the set of print data that has been input by the user.

Thus, the processes in FIG. 5 are finished.

<<Printing Print Data>>

Figure 6:
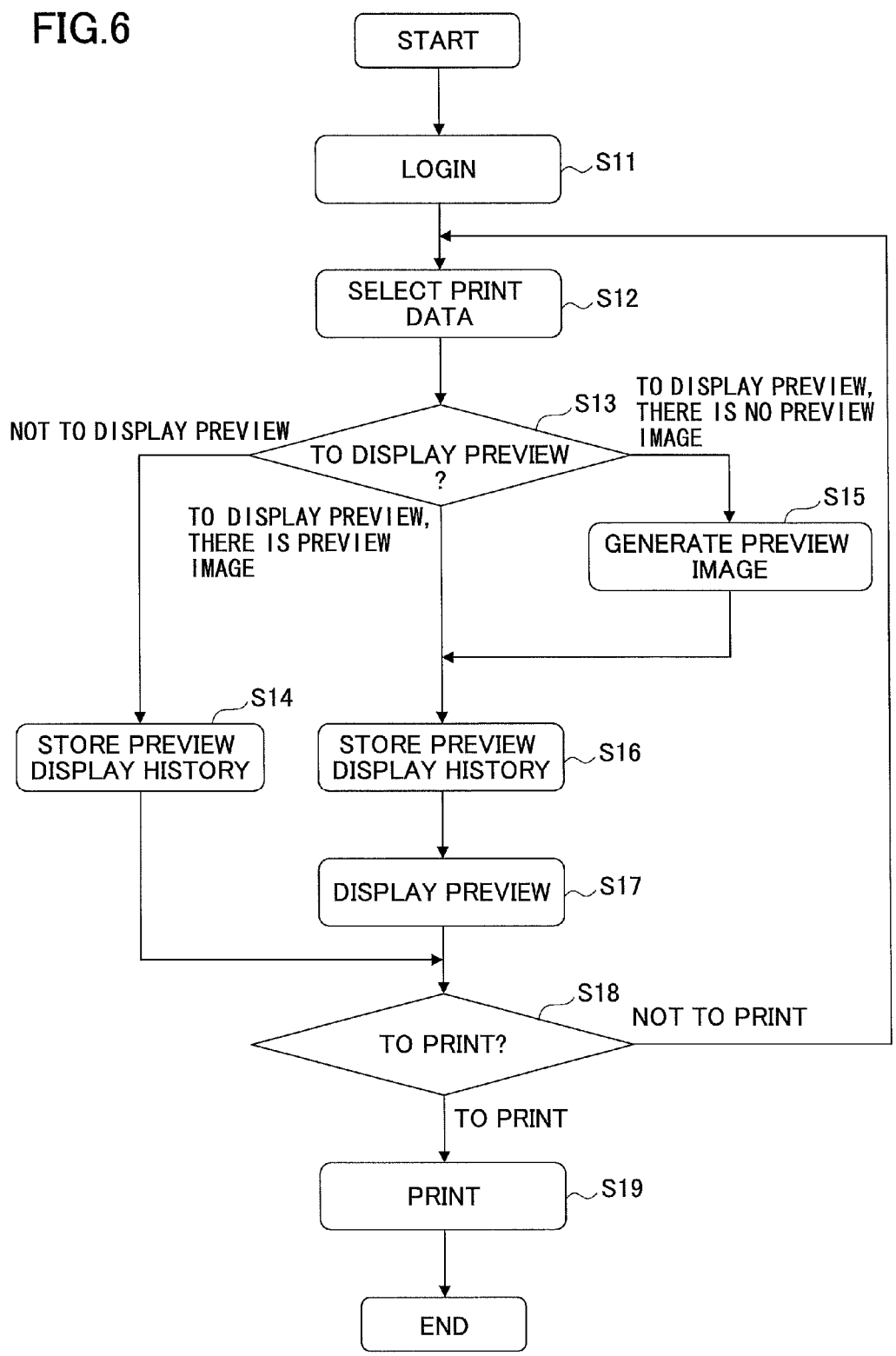
FIG. 6 is a flowchart in one example showing processes of the image forming apparatus according to the first embodiment at a time of printing print data.

FIG. 6 is a flowchart of one example of processes of the image forming apparatus 13 at a time of printing a set of print data.

The user carries out a login operation on the operation panel 202 of the image forming apparatus 13. When having received the login operation thus carried out by the user, the image forming apparatus 13 starts the processes of the flowchart of FIG. 6.

Then, in step S11, the display control part 25 of the image forming apparatus 13 refers to the print data storage part 26, and displays, for example, on the operation panel 202, a list of sets of print data that the user(s) who has(have) thus logged in.

Then, in step S12, the display control part 25 allows the user to select a set of print data from among the list of sets of print data thus displayed on the operation panel 202. The user can select, for example, a set of print data that the user wishes to print from among the list of sets of print data displayed on the operation panel 202.

Then, in step S13, the display control part 25 receives, from the user, a selection as to whether to carry out a preview display of the selected set of print data. The user can select whether to carry out a preview display of the set of print data that the user has selected from the list of sets of print data in step S12.

Then, when the display control part 25 has received a selection not to carry out a preview display ("not to display preview"), the process proceeds from step S13 to step S14.

In step S14, the preview display history management part 24 records the history of not having carried out a preview display in the preview display history storage part 28 as will be described later. Then, the process proceeds to step S18.

On the other hand, when the display control part 25 has received a selection to carry out a preview display in step S13 ("to display preview"), the display control part 25 refers to the preview image storage part 27 and determines whether there is a preview image of the set of print data that has been selected by the user in step S12.

Then, when there is no preview image of the set of print data selected by the user ("there is no preview image"), the process proceeds from step S13 to step S15.

In step S15, the preview image generation part 23 generates a preview image of the set of print data selected by the user, in step S15. A preview display is thus delayed in a case where there is no preview image of the set of print data selected by the user ("there is no preview image" in step S13) because time is required for generating a preview image in step S15.

The preview image thus generated by the preview image generation part 23 in step S15 is stored in the preview image storage part 27.

Then, in step S16, the preview display history management part 24 records, in the preview display history storage part 28, the history indicating whether a preview display has been carried out as will be described later.

On the other hand, when there is a preview image of the set of print data selected by the user ("there is preview image" in step S13), step S15 is skipped, and the process directly proceeds from step S13 to step S16.

In step S16, as mentioned above, the preview display history management part 24 records, in the preview display history storage part 28, the history indicating whether a preview display has been carried out as will be described later.

Thus, a preview display is carried out at high speed in a case where there is a preview image of the set of print data selected by the user ("there is preview image" in step S13→step S16), because no time is required for generating a preview image (skipping step S15). The preview image thus generated by the preview image generation part 23 is stored in the preview image storage part 27.

Then, in step S17 subsequent to step S16, the display control part 25 reads the preview image of the set of print data selected by the user from the preview image storage part 27, and carries out a preview display using the preview image. Then, the process proceeds to step S18.

In step S18, the display control part 25 receives a selection from the user as to whether to print the set of print data selected by the user. When having received a selection not to print the set of print data selected by the user ("not to print" in step S18), the display control part 25 returns to step S12.

On the other hand, when the display control part 25 has received a selection to print the set of print data selected by the user ("to print" in step S18), the print control part 29 proceeds to step S19, and prints the set of print data selected by the user.

Thus, the processes in FIG. 6 are finished.

<<Information Stored by Preview Display History Storage Part 28>>

FIGS. 7A and 7B are configuration diagrams of one example of the histories of having carried out a preview display and not having carried out a preview display stored in the preview display history storage part 28.

FIG. 7A shows information having, as items, "execution date/time", print settings (print attributes) such as the "number of pages", "N-in-1", and/or the like, and whether a preview display has been carried out ("preview display").

Note that "N-in-1" means a print setting (print attribute) for including multiple pages included in a set of print data into one page at a time of printing. For example, "2in1" (attribute value) means a print setting for including two pages included in a set of print data into one page at a time of printing.

Note that "execution date/time" may be, for example, the date/time at which the set of print data has been stored.

Thus, FIG. 7A shows information indicating when preview displays of sets of print data have been carried out and what (attribute values of) print attributes the sets of print data have.

FIG. 7B shows information having, as items, "print attribute", "attribute value", the "number of times of printing", the "number of times of preview displays", and a "ratio (%) of preview displays". As to "print attribute", in addition to the "number of pages" and "N-in-1" shown in FIG. 7B, color/monochrome, the number of copies, simplex/duplex, stapling, punching and/or the like may be included.

Note that "simplex/duplex" means a print setting (print attribute) for printing an image(s) only on one side of a sheet of paper ("simplex") or both sides of a sheet of paper ("duplex").

FIG. 7B shows information indicating, for each print attribute, how often a preview display has been carried out for each attribute value.

The information of FIG. 7B is generated as a result of totaling up the information of FIG. 7A.

In the information of FIG. 7B, each record includes, for each attribute value of each print attribute, the number of times of printing, the number of times of preview displays and a ratio (%) of preview displays. "Ratio (%) of preview displays" is calculated by dividing "the number of times of preview displays" by "the number of times of printing", and therefore, may be omitted from the items to be stored in the preview display history storage part 28.

In the example of FIG. 7B, the attribute values of the print attribute the "number of pages" are classified into four categories, i.e., "10 pages or less", "11 to 50 pages", "51 to 100 pages" and "101 pages or more".

For example, in a case where a preview display of a set of print data having 6 pages has been carried out, each of the number of times of printing and the number of times of preview displays in the record of the attribute value "10 pages or less" is incremented by "1".

In a case where a set of print data having 12 pages has been input but no preview display has been carried out therefor, the number of times of printing in the record of the attribute value "11 to 50 pages" is incremented by "1" but the number of times of preview displays in the same record is not updated.

Note that, also for the case of the print attribute "N-in-1", the records are processed in the same manner as for the case of the print attribute "number of pages" described above.

<<Settings Concerning Preview Display History Storage Part 28>>

The preview display history management part 24 receives settings concerning the preview display history storage part 28, for example, via a setting screen page shown in FIG. 8. FIG. 8 is an image diagram of one example of a setting screen page for a user to carry out setting concerning the preview display history storage part 28.

On the setting screen page of FIG. 8, it is possible to carry out setting for each print attribute. For example, on the setting screen page of FIG. 8, it is possible to select, for each print attribute, "use" or "not use". That is, it is possible to select, for each print attribute, either to "use" or "not use" the print attribute for determining whether to carry out a preview display.

Further, on the setting screen page of FIG. 8, it is possible to designate, as the attribute values of the print attribute "number of pages", the respective groups "10 pages or less", "11 to 50 pages", "51 to 100 pages" and "101 pages or more".

Further, on the setting screen page of FIG. 8, it is possible to set a "threshold" to be used for determining whether to carry out a preview display, for each group of the attribute values.

For example, in a case where the threshold for the group "10 pages or less" has been set as "80%", as shown, the preview determination part 22 determines in step S1 that it is not necessary to generate a preview image for a set of print data having the attribute value "10 pages or less", in a case where, for example, preview displays have been carried out on 70% of the sets of print data each having the attribute value "10 pages or less".

On the other hand, the preview determination part 22 determines in step S1 that it is necessary to generate a preview image for a set of print data having the attribute value "10 pages or less", in a case where, for example, preview displays have been carried out on 90% of the sets of print data each having the attribute value "10 pages or less".

In a case where a threshold is set as "0%" for a group of attribute values of the print attribute "number of pages" on the setting screen page of FIG. 8, the preview determination part 22 always determines that it is necessary to generate a preview image for a set of print data that belongs to the group.

Note that on the setting screen page of FIG. 8, check boxes 1001 are provided for the groups of the attribute values of the print attribute "N-in-1 setting". Therefore, it is possible to select, for each group of attribute values, as to whether to use the group of attribute values for determining whether it is necessary to generate a preview image.

Further, on the setting screen page of FIG. 8, it is possible to set the number of days to store the preview display history ("please set number of days to store") as shown.

This is because, generally speaking, the storage capacity of the HDD 215 of the image forming apparatus 13 or the like has a limit, and also, the tendency of a user who wishes a preview display may vary depending on the timings.

For example, the number of days to store the preview display history is set as "7 days", as shown, thus, the image forming apparatus 13 stores the preview display history for the most recent 7 days, and deletes the preview display history that has been stored at 8 days before or earlier.

Therefore, in a case where the number of days to store the preview display history has been thus set as "7 days", the "ratio (%) of preview displays" in FIG. 7B is calculated using the "number of times of printing" and the "number of times of preview displays" stored for the most recent 7 days.

<Summary of First Embodiment>

According to the printing system 1 in the first embodiment, it is possible to dynamically determine a set of print data having high probability that a preview display will be carried out, using a history of preview displays that a user(s) has (have) actually carries out. Therefore, it is possible to previously generate a preview image of a set of print data having high probability that a preview display will be carried out.

Therefore, the printing system 1 according to the first embodiment can increase the speed in a preview display of a set of print data having high probability that a preview display will be carried out while avoiding uselessly generating a preview image of a set of print data having low probability that a preview display will be carried out.

Second Embodiment

According to a second embodiment, a management server 14 is added to the printing system 1 according to the first embodiment, and a part of the functions of the image forming apparatus 13 according to the first embodiment is carried out by the management server 14. The printing system 2 according to the second embodiment is the same as the printing system 1 according to the first embodiment, except for a part. Therefore, a description will be omitted appropriately.

<System Configuration>

Figure 9:
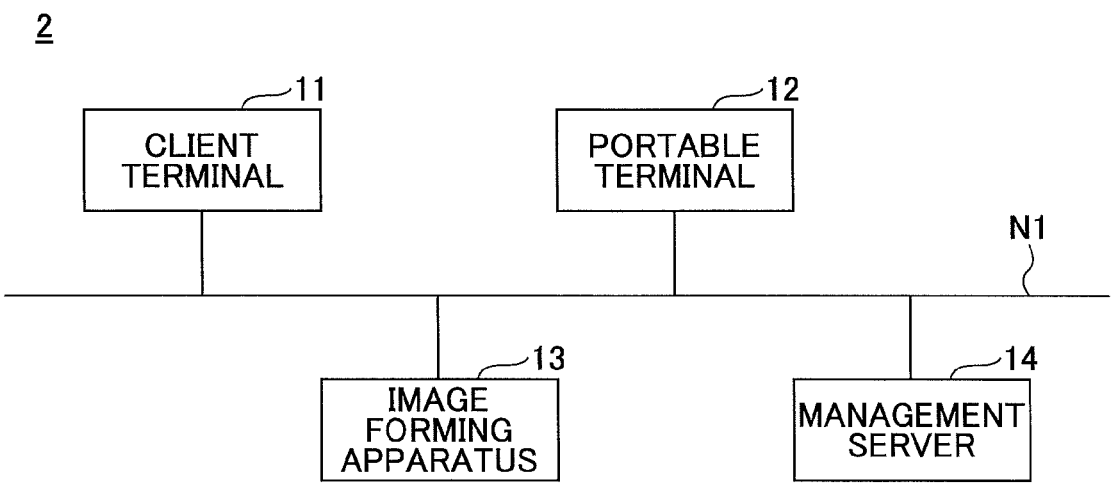
FIG. 9 is a configuration diagram that illustrates one example of a printing system according to a second embodiment.

FIG. 9 is a configuration diagram of one example of the printing system 2 according to the second embodiment. As mentioned above, in the printing system 2 of FIG. 9, the management server 14 is added to the printing system 1 of FIG. 1. The management server 14 carries out a part of the functions of the image forming apparatus 13 according the first embodiment. In the printing system 2 of FIG. 9, in addition to the functions of the printing system 1 of FIG. 1, functions are provided to transmit print data and preview images to the image forming apparatus 13 from the management server 14. The management server 14 is realized by a hardware configuration such as that shown in FIG. 2.

<Software Configuration>

The management server 14 in the printing system 2 of FIG. 9 is realized by, for example, process blocks shown in FIG. 10. Further, the image forming apparatus 13 in the printing system 2 of FIG. 9 is realized by, for example, process blocks shown in FIG. 11. FIG. 10 is process block diagram of one example of the management server 14 according to the second embodiment. FIG. 11 is a process block diagram of one example of the image forming apparatus 13 according to the second embodiment.

<<Management Server 14>>

By executing a program(s), the management server 14 realizes a print data analysis part 31, a preview determination part 32, a preview image generation part 33, a preview display history management part 34, a print data storage part 35, a preview image storage part 36, a preview display history storage part 37, a print data transmission part 38 and a preview image transmission part 39.

The print data analysis part 31, the preview determination part 32, the preview image generation part 33, the preview display history management part 34, the print data storage part 35, the preview image storage part 36 and the preview display history storage part 37 in the management server 14 correspond to the print data analysis part 21, the preview determination part 22, the preview image generation part 23, the preview display history management part 24, the print data storage part 26, the preview image storage part 27 and the preview display history storage part 28 in the image forming apparatus 13 of FIG. 4, respectively.

Further, the management server 14 has the print data transmission part 38 for transmitting print data to the image forming apparatus 13 and the preview image transmission part 39 for transmitting preview images to the image processing apparatus 13.

<<Image Forming Apparatus 13>>

The image forming apparatus 13 executes a program(s), and thereby, realizes a display control part 41, a print data reception part 42, a print control part 43 and a preview image reception part 44. The display control part 41 and the print control part 43 in the image forming apparatus 13 correspond to the display control part 25 and the print control part 29 in the image forming apparatus 13 of FIG. 4, respectively. Further, the image forming apparatus 13 of FIG. 11 has the print data reception part 42 for receiving print data from the management server 14 and the preview image reception part 44 for receiving preview images from the management server 14.

<Details of Processes>

Processes in the printing system 2 according to the second embodiment are the same as those in the printing system 1 according to the first embodiment, except for a part. In the printing system 2, a part of the functions of the image forming apparatus 13 in the printing system 1 is included in the management sever 14. Further, the functions for transmitting and receiving the necessary data between the image forming apparatus 13 and the management server 14 are newly provided.

Note that the manner of sharing the functions between the image forming apparatus 13 and the management server 14 shown in FIGS. 10 and 11 is one example, and the functions of the image forming apparatus 13 and the management server 14 may be shared therebetween in another way. Note that the processes other than those of transmitting and receiving the necessary data between the image forming apparatus 13 and the management server 14 are the same as those in the printing system 1 according to the first embodiment, and duplicate description will be omitted.

<Summary of Second Embodiment>

According to the printing system 2 in the second embodiment, it is possible to obtain the same advantageous effects as those of the printing system 1 according to the first embodiment even when a part of the functions of the image forming apparatus 13 in the first embodiment is included in the management server 14.

Third Embodiment

A printing system 3 according to a third embodiment uses a service providing system that provides a service such as that typified by a cloud service.

<System Configuration>

Figure 12:
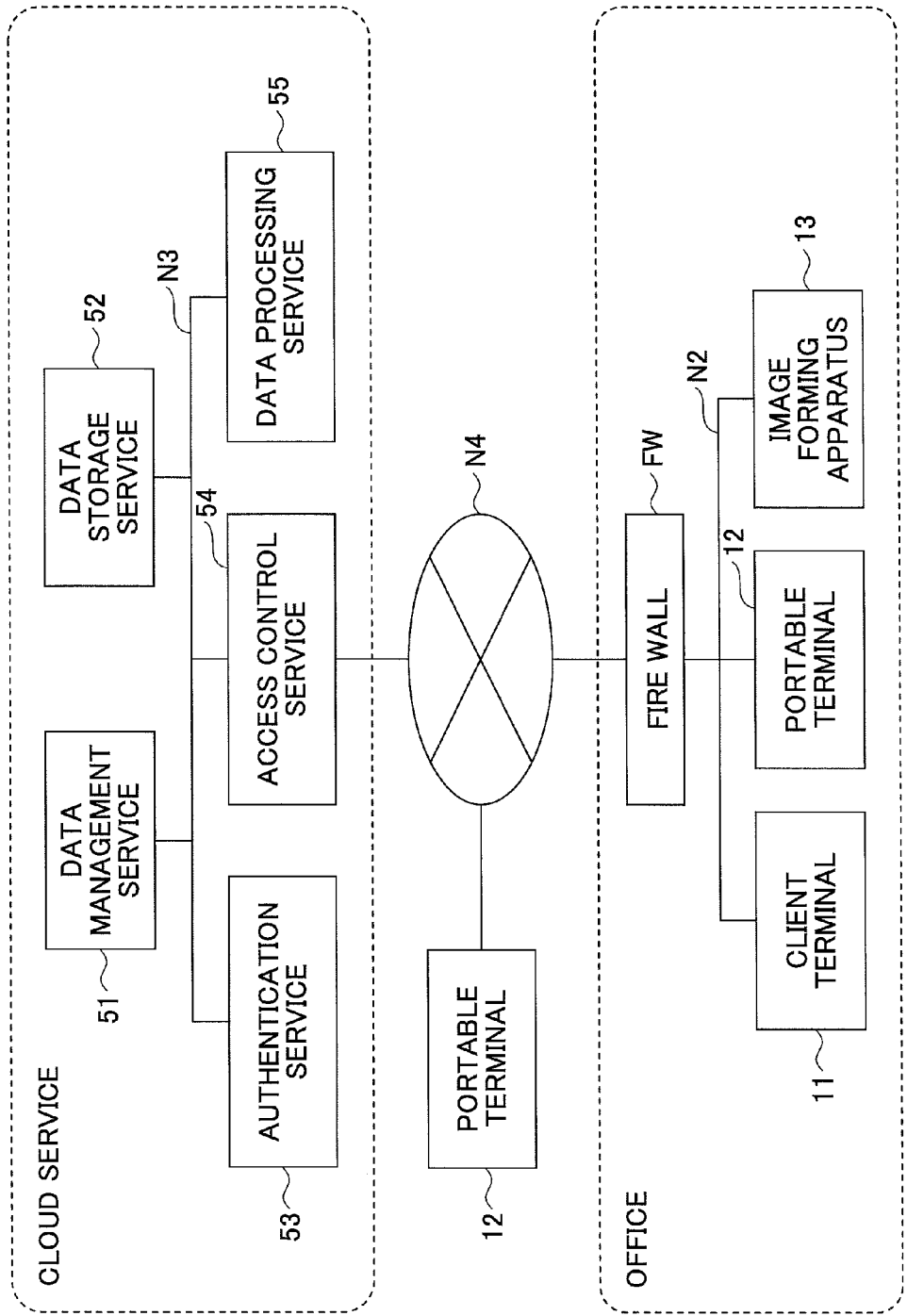
FIG. 12 is a configuration diagram that illustrates one example of a printing system according to a third embodiment.

FIG. 12 is a configuration diagram of one example of a printing system 3 according to the third embodiment. The printing system 3 includes a private network N2 such as an intra-office network, a network N3 that provides a service such as that typified by a cloud service, and a network N4 such as the Internet.

The network N2 and the network N4 are connected by a firewall FW provided on the side of the network N2. The firewall FW is installed at a connection point between the network N2 and the network N4, and relays an access from the network N2 to the network N4.

The network N3 and the network N4 are connected by an access control service 54 provided on the side of the network N3. The security of the network N3 is provided by the access control service 54.

The network N2 is a private network inside the firewall FW. To the network N2, a client terminal 11, a portable terminal 12 and an image processing apparatus 13 are connected. The client terminal 11, the portable terminal 12 and the image processing apparatus 13 are the same as those in the first embodiment, respectively, and duplicate description will be omitted.

The network N3 includes one or more computer systems that provide functions using a Web application(s) and/or an application(s) provided on the side of a server. By the one or more computer systems, a data management service 51, a data storage service 52, an authentication service 53, the access control service 54, a data processing service 55 and so forth are realized on the side of the network N3.

Note that a part of the services on the side of the network N3 may be included in the network N2. Further, terminal apparatuses such as the client terminal 11 and the portable terminal 12 may be provided outside the private network N2 such as an intra-office network.

The data management service 51 carries out data management and a process (such as transmitting a job list, transmitting a job, deleting a job, and/or the like) in response to a request that is input by a user who has logged in.

The data storage service 52 stores electronic data such as photograph data, image data, document data, print data and/or the like.

The authentication service 53 stores management information such as user information, company and device information, and so forth, and carries out, based on the management information, an authentication determination process, provides management information, and so forth.

The access control service 54 controls login into various services such as the data management service 51, the data storage service 52, the authentication service 53, the data processing service 55 and so forth.

The data processing service 55 carries out a process on data that has been input by the user such as a data conversion process, a data transfer and/or storage process, or the like.

Note that a hardware configuration of the computer system(s) that realizes the data management service 51, the data storage service 52, the authentication service 53, the access control service 54 and the data processing service 55 is the same as that shown in FIG. 2, and thus, duplicate description will be omitted.

Further, hardware configurations of the client terminal 11, the portable terminal 12 and the image forming apparatus 13 are the same as those in the first embodiment, and thus, duplicate description will be omitted.

<Software Configuration>

<<Terminal Apparatuses>>

Figure 13:
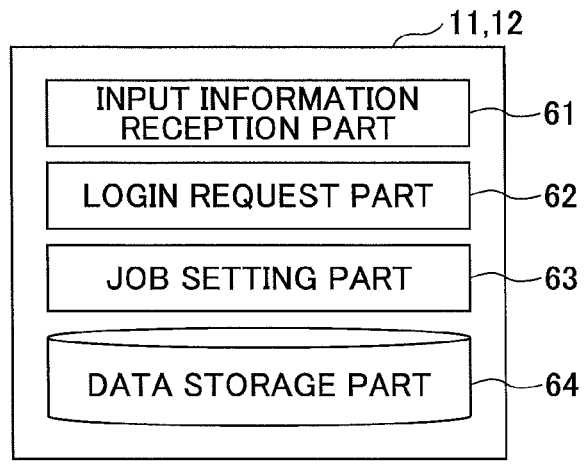
FIG. 13 is a process block diagram that illustrates one example of a terminal apparatus according to the third embodiment.

Each of terminal apparatuses such as the client terminal 11, the portable terminal 12 and so forth according to the third embodiment is realized by, for example, process blocks shown in FIG. 13. FIG. 13 is a process block diagram of one example of the terminal apparatus according to the third embodiment.

By executing a program(s), the terminal apparatus shown in FIG. 13 realizes an input information reception part 61, a login request part 62, a job setting part 63 and a data storage part 64.

The input information reception part 61 receives a user's keyboard input, biological information input and information that is input from a screen touching operation, or the like.

The login request part 62 transmits authentication information that has been input and requests login into an external service.

The job setting part 63 sets a job to be input to an external service in response to the user's operation. The job setting part 63 sets execution condition information for the job.

The data storage part 64 stores electronic data that can be set as the job, such as application data, Web data or the like.

<<Image Forming Apparatus 13>>

Figure 14:
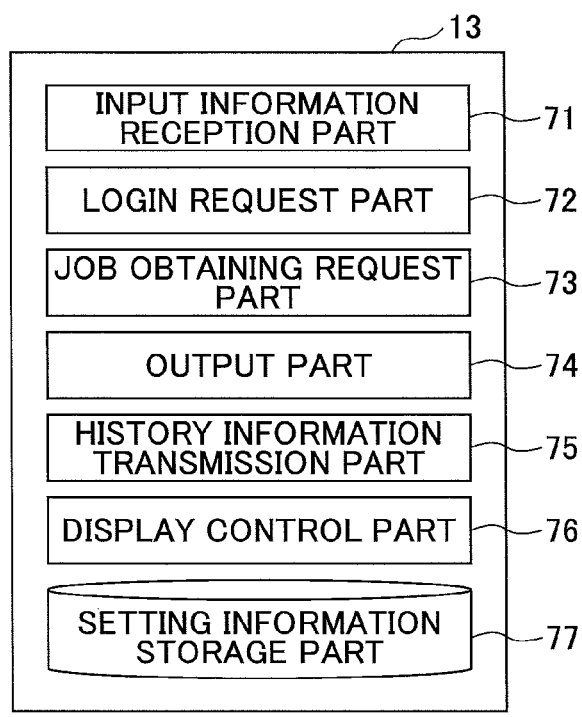
FIG. 14 is a process block diagram that illustrates one example of an image forming apparatus according to the third embodiment.

The image forming apparatus 13 according to the third embodiment is realized by process blocks such as those shown in FIG. 14. FIG. 14 is a process block diagram of one example of the image forming apparatus 13 according to the third embodiment.

By executing a program(s), the image forming apparatus 13 of FIG. 14 realizes an input information reception part 71, a login request part 72, a job obtaining request part 73, an output part 74, a history information transmission part 75, a display control part 76 and a setting information storage part 77.

The input information reception part 71 receives a user's keyboard input, biological information input, information that is input from a screen touching operation on the operation panel 202, an approach of an IC card to a card reader or the like.

The login request part 72 transmits authentication information that is obtained from a user's operation to an external service and sends a login request thereto.

The job obtaining request part 73 transmits a request to obtain a job from the data management service 51.

The output part 74 executes a job that has been received.

The history information transmission part 75 transmits a history (log) of the executed job to the data management service 51. A "history (log) of the executed job" may be a "history indicating whether a preview display has been carried out" described above.

The display control part 76 controls a screen display on a display part (the operation panel 202). The display control part 76 controls a display of a login screen page, an operation screen page, a preview screen page and so forth.

The setting information storage part 77 stores company codes and device information that have been set.

<<Data Management Service 51>>

Figure 15:
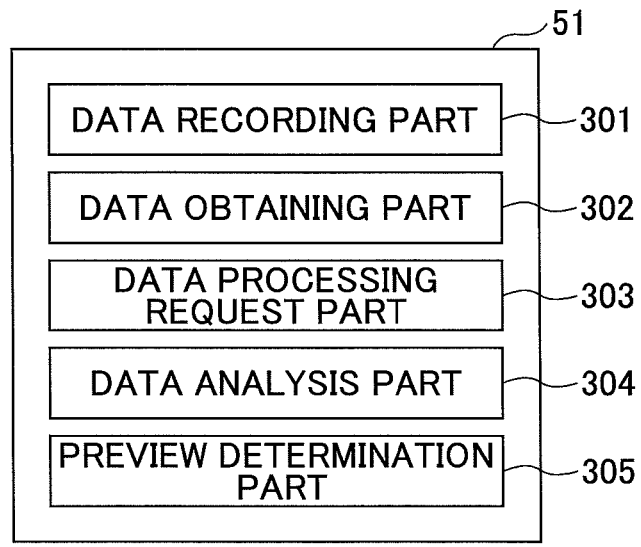
FIG. 15 is a process block diagram that illustrates one example of a data management service according to the third embodiment.

The data management service 51 according to the third embodiment is realized by process blocks such as those shown in FIG. 15, for example. FIG. 15 is a process block diagram of one example of the data management service 51 according to the third embodiment.

By executing a program(s) by the computer system(s), the data management service 51 in FIG. 15 realizes a data recording part 301, a data obtaining part 302, a data processing request part 303, a data analysis part 304 and a preview determination part 305.

The data recording part 301 causes the data storage service 52 to store data.

The data obtaining part obtains data from the data storage service 52.

The data processing request part 303 requests the data processing service 55 to carry out a data conversion process on electronic data and a process of generating a preview image.

The data analysis part 304 analyses data. Specifically, the data analysis part 304 analyses data to obtain an attribute thereof such as (an attribute value(s) of) a print attribute(s) mentioned above, analyzes electronic data to obtain a data format thereof to determine whether to convert it, and so forth.

The preview determination part 305 determines whether it is necessary to generate a preview image, based on (the attribute value(s) of) the print attribute(s) of print data mentioned above, for example.

<<Data Storage Service 52>>

Figure 16:
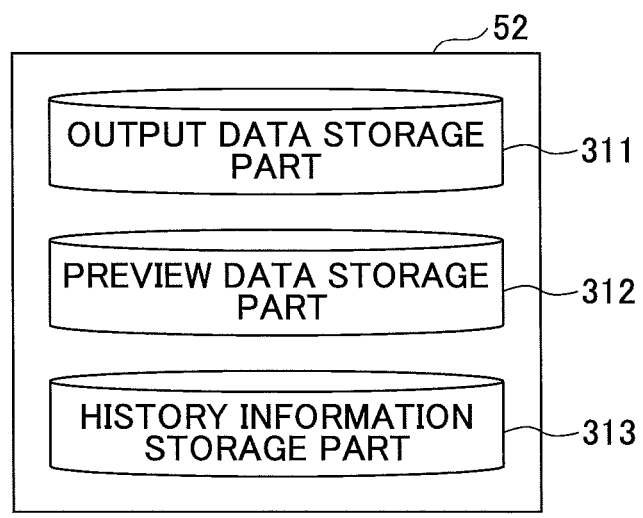
FIG. 16 is a process block diagram that illustrates one example of a data storage service according to the third embodiment.

The data storage service 52 according to the third embodiment is realized by process blocks such as those shown in FIG. 16, for example. FIG. 16 is a process block diagram of one example of the data storage service 52 according to the third embodiment.

By executing a program(s) by the computer system(s), the data storage service 52 in FIG. 16 realizes an output data storage part 311, a preview data storage part 312 and a history information storage part 313.

The output data storage part 311 stores electronic data. The electronic data may be application data, output data such as print data, job information (i.e., information associating job identification such as job IDs with print data, information associating job identification information with user identification information and/or company codes, and/or the like), and/or the like. Further, the output data storage part 311 also stores information indicating states of the stored electronic data (i.e., information as to whether the data is being processed, is in an output standby state, has been output, and/or the like).

The preview data storage part 312 stores a preview image of output data such as print data.

The history information storage part 313 stores history information of a job that has been executed. The history information of a job includes a history indicating whether a preview display has been carried out mentioned above. The history indicating whether a preview display has been carried out may be such that the history shown in FIGS. 7A and 7B of the like is associated with a corresponding company code, and is stored.

<<Authentication Service 53>>

Figure 17:
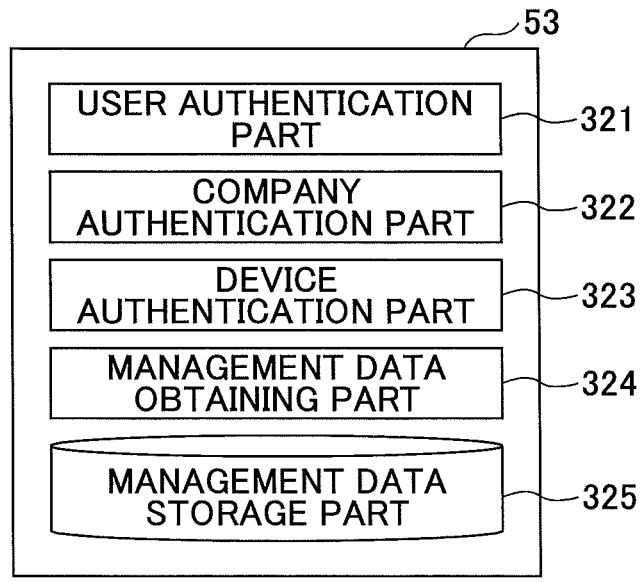
FIG. 17 is a process block diagram that illustrates one example of an authentication service according to the third embodiment.

The authentication service 53 according to the third embodiment is realized by process blocks such as those shown in FIG. 17, for example. FIG. 17 is a process block diagram of one example of the authentication service 53 according to the third embodiment.

By executing a program(s) by the computer system(s), the authentication service 53 in FIG. 17 realizes a user authentication part 312, a company authentication part 322, a device authentication part 323, a management data obtaining part 324 and a management data storage part 325.

The user authentication part 321 carries out an authentication determination using user information (i.e., user identification information such as a user name, a user ID and/or the like, and a password) included in received authentication information, based on user identification information and passwords included in the management data that the management data storage part 325 stores.

The company authentication part 322 carries out an authentication determination using company information (for example, a company code, an office code, an organization code and/or the like) included in received authentication information, based on company codes included in the management data that the management data storage part 325 stores.

The device authentication part 323 carries out an authentication determination using device information (for example, a device ID, an application ID and/or the like) included in received authentication information, based on device information included in the management data that the management data storage part 325 stores.

The management data obtaining part 324 obtains authenticated management data included in the management data that the management data storage part 325 stores.

The management data storage part 325 stores the management data such as the user information, the company and device information and so forth.

<<Access Control Service 54>>

Figure 18:
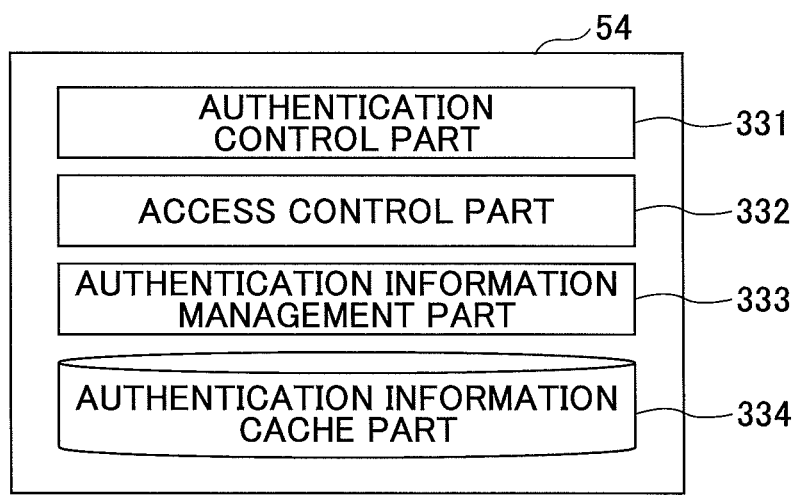
FIG. 18 is a process block diagram that illustrates one example of an access control service according to the third embodiment.

The access control service 54 according to the third embodiment is realized by process blocks such as those shown in FIG. 18, for example. FIG. 18 is a process block diagram of one example of the access control service 54 according to the third embodiment.

By executing a program(s) by the computer system(s), the access control service 54 in FIG. 18 realizes an authentication control part 331, an access control part 332, an authentication information management part 333 and an authentication information cache part 334.

The authentication control part 331 controls authentication determination processes. The authentication determination processes are carried out using an authentication information cache(s) that the authentication information cache part 334 has, or are carried out by the authentication service 52 in response to requests sent from the authentication control part 331.

The access control part 332 determines whether to permit accesses to other services according to the authentication results of the authentication determination processes.

The authentication information management part 333 receives authentication information (including company information, device information and/or the like) concerning a user who has been authenticated by the authentication service 53, and stores the received authentication information in the authentication information cache part 334.

Further, the authentication information management part 333 periodically receives authentication information from the authentication service 53, stores the received authentication information in the authentication information cache part 334, or deletes authentication information from the authentication cache part 334.

The authentication information cache part 334 caches authentication information (cookie) of a user who has been authenticated.

<<Data Processing Service 55>>

Figure 19:
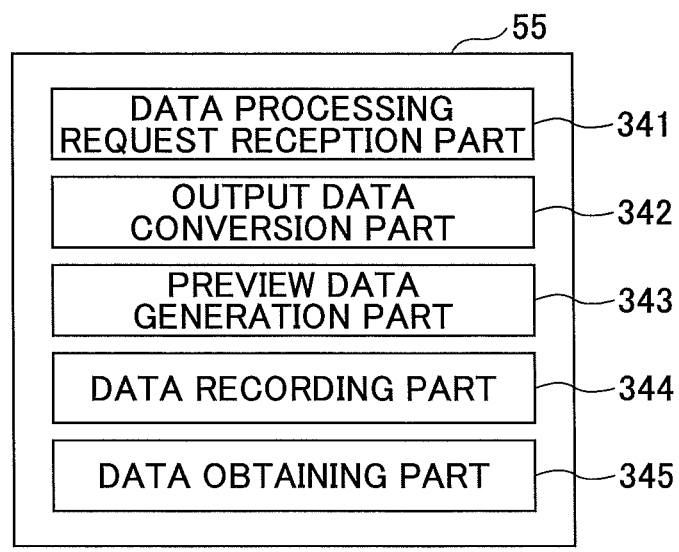
FIG. 19 is a process block diagram that illustrates one example of a data processing service according to the third embodiment.

The data processing service 55 according to the third embodiment is realized by process blocks such as those shown in FIG. 19, for example. FIG. 19 is a process block diagram of one example of the data processing service 55 according to the third embodiment.

By executing a program(s) by the computer system(s), the data processing service 54 in FIG. 19 realizes a data processing request reception part 341, an output data conversion part 342, a preview data generation part 343, a data recording part 344 and a data obtaining part 345.

The data processing request reception part 341 receives a request for data processing.

The output data conversion part 342 carries out a data conversion process such as a process of converting application data into output data such as print data mentioned above. The data conversion process includes one or more processes on data such as a process of converting application data into PDF data, a process of converting PDF data into PDL data, a process of storing data in a desired storage and/or the like.

The preview data generation part 343 generates a preview image of output data such as print data.

The data recording part 344 causes the data storage service 52 to store data.

The data obtaining part 345 obtains data from the data storage service 52.

FIG. 20 is a configuration diagram of one example of the job information.

The job information of FIG. 20 includes, as items, the job ID, the company code, the user identification information, and bibliographic information such as a title.

The job information of FIG. 20 associates the job ID with the company code and the user identification information.

FIG. 21 is configuration diagram of one example of preview data information.

The preview data information of FIG. 21 includes, as items, the job ID and a preview data ID.

The preview data information of FIG. 21 associates the job ID with the preview data ID of a preview image of output data such as print data.

FIGS. 22A and 22B are configuration diagrams of one example of the management data.

FIG. 22A shows the user information as one example of the management data.

The user information includes, as items, company information, the company code, the user identification information, the password, address information, an output setting and so forth. The user information associates the company code with the user identification information.

FIG. 22B shows the company and device information as one example of the management data.

The company and device information of FIG. 22B includes, as items, the company code and the device information. The company and device information associates the company code with the device information.

<Details of Processes>

<<Job Input Process>>

FIG. 23 is a sequence diagram in one example showing a job input process.

When the terminal apparatus has received a login request from a user, the terminal apparatus proceeds to step S21.

In step S21, the terminal apparatus sends a login request to the access control service 54.

Then, in step S22, the access control service 54 sends an authentication request to the authentication service 53.

Then, in step S23, the authentication service 54 carries out authentication as will be described later.

Then, in step S24, the authentication service 54 returns the authentication result to the access control service 54.

Then, in step S25, the access control service 54 transmits, as a login response, the authentication result to the terminal apparatus.

Note that in a case where the authentication result indicates a success (authentication OK), the access control part 54 also sends a token (cookie) to the terminal apparatus. The access control service 54 stores the token in such a manner of associating it with the user who has been thus authenticated.

The processes including and subsequent to step S26 in FIG. 23 show an example of the case where the authentication result indicates a success (authentication OK).

Then, in step S26, the terminal apparatus transmits a job (that has been set by the job setting part 63) together with the token to the access control service 54, and thus, sends a job input request thereto.

At this time, the terminal apparatus can input, as the job, print data having a Page Description Language (PDL) format, application data that has been generated using an application such as word-processing software, spreadsheet software or the like, or so. The data input request may include the execution condition information. The job may be URL data for identifying Web data.

The access control service 54 determines whether the tokens that the access control service 54 itself stores include the token included in the received job input request.

When the tokens that the access control service 54 itself stores include the token included in the received job input request, the access control service 54 transmits the job to the data management service 51 in step S27.

On the other hand, when the tokens that the access control service 54 itself stores do not include the token included in the received job input request, the access control service 54 transmits the authentication information included in the received token to the authentication service 53, and sends an authentication request thereto.

Then, in step S28, the data analysis part 304 of the data management service 51 analyses the job that has been thus input. For example, the data analysis part 304 analyses the job to determine an attribute of data such as (an attribute value(s) of) a print attribute(s) of print data, a data format of electronic data for determining whether it is necessary to convert it into output data, and/or the like.

Then, in step S29, the data obtaining part 302 of the data management service 51 sends a request to the data storage service 52 to obtain the history information corresponding to the company code from the history information storage part 313.

Then, in step S30, the data obtaining part 302 of the data management service 51 obtains the history information corresponding to the company code from the data storage service 52.

Then, in step S31, the preview determination part 305 of the data management service 51, in the same manner as that of the preview determination part 22 according to the first embodiment, determines whether it is necessary to generate a preview image.

Note that the settings shown in FIG. 8 may be set for each company or in common among companies, according to the third embodiment. Further, the number of days to store the preview display history may be replaced by an upper limit of an amount of the preview display history to store.

Then, in step S32, the data recording part 301 of the data management service 51 gives a job ID to the job that has been received as the job input request, and causes the data storage service 52 to store the job.

Further, the data recording part 301 causes the data storage service 52 to store the job information associating the job ID with the authentication information (the company code and the user identification information).

Then, in step S33, the data processing request part 303 of the data management service 51 sends, to the data processing service 55, a data processing request (i.e., a request to carry out a data conversion process of converting the received job into output data and/or a process of generating a preview image) based on the analysis result of the data analysis part 304 (in step S28) and the determination result of the preview determination part 305 (in step S31).

Then, in steps S34 and S35, the data obtaining part 345 of the data processing service 55 obtains the job corresponding to the job ID from the data storage service 52.

Then, in step S36, the output data conversion part 342 and/or the preview data generation part 343 of the data processing service 55 execute the data processing based on the received data processing request.

Then, in step S37, the data recording part 344 of the data processing service 55 causes the data storage service 52 to store the result of the data processing (i.e., the output data converted from the job, the generated preview image, and/or the like) obtained based on the received data processing request. At this time, the output data is stored in the output data storage part 311 and the preview image is stored in the preview data storage part 312.

Thus, the processes in FIG. 23 are finished.

<<Login Process from Terminal Apparatus>>

Figure 24:
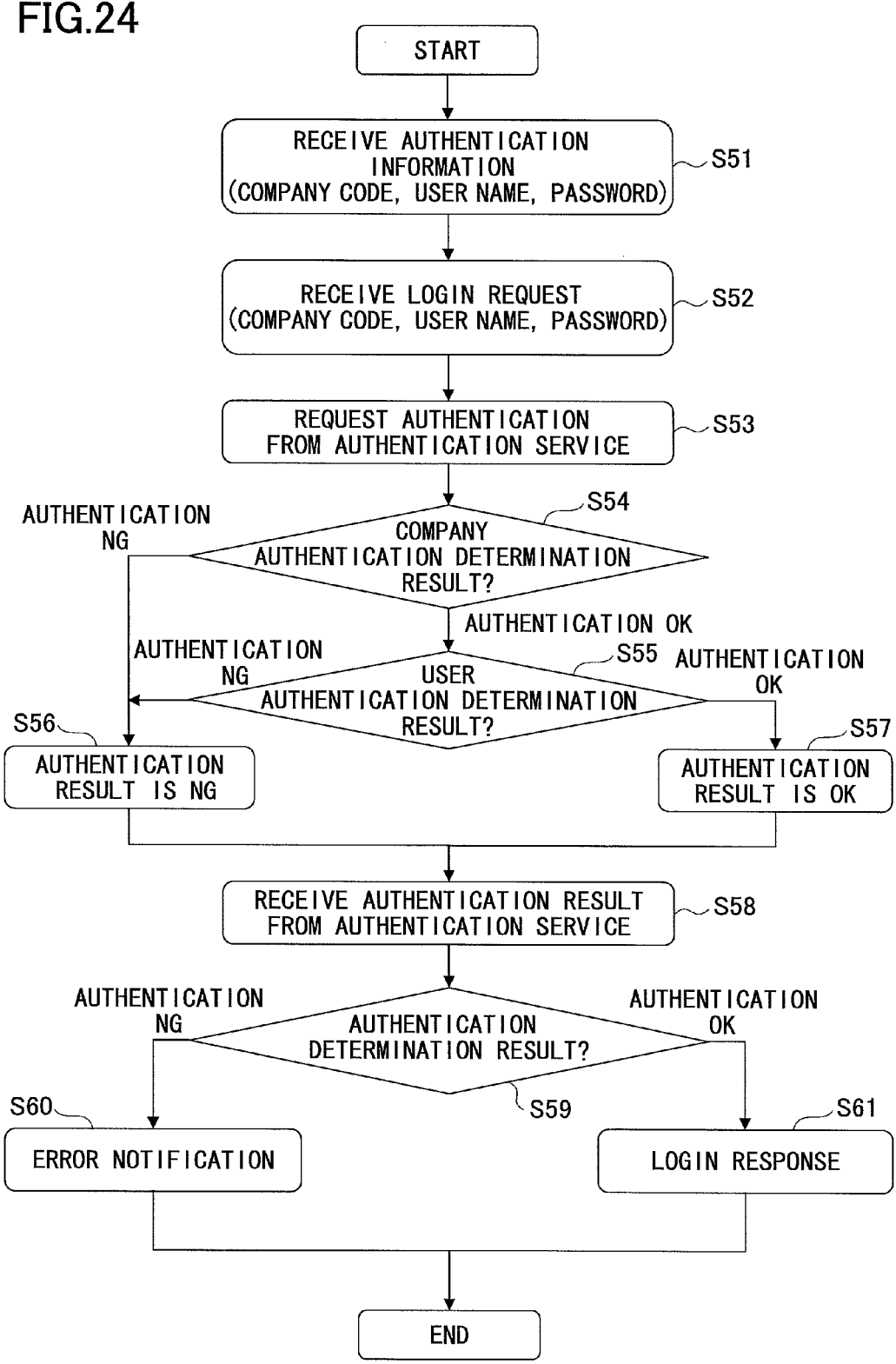
FIG. 24 is a flowchart in one example showing a login procedure from the terminal apparatus.

The terminal apparatus carries out a login process such as that shown in FIG. 24. FIG. 24 is a flowchart in one example showing a login procedure carried out by the terminal apparatus.

In step S51, the terminal apparatus receives an input of authentication information (company code, user name and password) from a user. The terminal apparatus then transmits, to the access control service 54, a login request for login into the data management service 51, based on the received authentication information.

Then, in step S52, the access control service 54 receives, from the terminal apparatus, the login request for login into the data management service 51.

Then, in step S53, the access control service 54 that has received the login request sends the authentication information included in the login request and thus sends an authentication request to the authentication service 53.

Then, in step S54, the authentication service 54 carries out a company authentication determination process based on the company code included in the received authentication information and the company codes included in the company and device information included in the management data.

When the company authentication has resulted in success (OK), the authentication service 53 carries out a user authentication determination process based on the user name and password included in the received authentication information and the user name and password of the user information included in the management data corresponding to the authenticated company code, in step S55.

When the user authentication has resulted in success (OK), the authentication service 53 returns the authentication result indicating that the authentication has resulted in success ("authentication result is OK") to the access control service 54, in step S57.

Note that, in a case where the company authentication has resulted in failure (No Good (simply referred to as "NG", hereinafter and in the drawings) in step S54 or the user authentication has resulted in failure (NG) in step S55, the authentication service 53 returns the authentication result indicating that the authentication has resulted in failure ("authentication result is NG") to the access control service 54, in step S56.

Then, in step S58, the access control service 54 receives the authentication result from the authentication service 53.

Then, in step S59, the access control service 54 determines the received authentication result.

Then, when the authentication result indicates the authentication failure (NG), the access control service 54 transmits an error notification indicating not to approve the login request to the terminal apparatus which has sent the login request, in step S60.

On the other hand, when the authentication result indicates the authentication success (OK), the access control service 54 transmits a login response indicating to approve the login request to the terminal apparatus that has sent the login request, in step S61.

Thus, the processes in FIG. 24 are finished.

<<Job Execution Process>>

Figure 25:
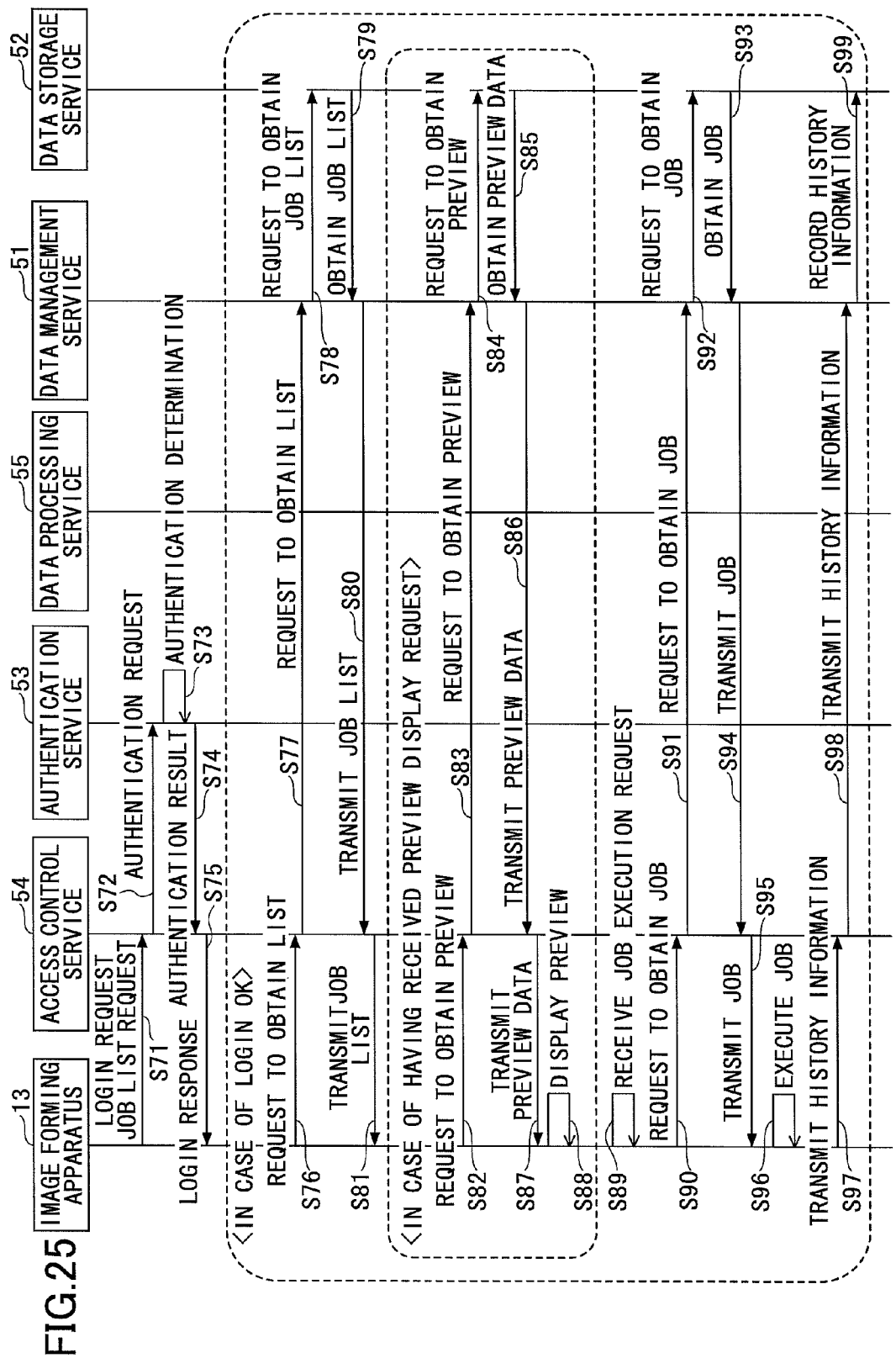
FIG. 25 is a sequence diagram in one example showing a job execution process.

FIG. 25 is a sequence diagram in one example showing a jog execution process. When having received a login request from a user, the image forming apparatus 13 proceeds to step S71, and sends a login request to the access control service 54.

Then, in step S72, the access control service 54 sends an authentication request to the authentication service 53.

Then, in step S73, the authentication service 53 carries out authentication as will be described later.

Then, in step S74, the authentication service 53 returns the authentication result to the access control service 54.

Then, in step S75, the access control service 54 transmits the authentication result to the image forming apparatus 13 as a login response. Note that, in a case where the authentication result indicates a success (authentication OK), the access control service 54 also transmits a token (cookie) to the image forming apparatus 13. The access control service 54 stores the token in a manner of associating it with the authenticated user.

The processes including step S76 and the subsequent steps show an example where the authentication result indicates a success (authentication OK).

Then, in step S76, the image forming apparatus 13 sends a list obtaining request by transmitting the company code and the user identification information together with the token to the access control service 54. The access control part 54 checks the token before proceeding to step S77, as in FIG. 23 before proceeding to step S27. However, because the details are the same as those in FIG. 23, duplicate description thereof will be omitted.

Then, in step S77, the access control service 54 sends a list obtaining request to the data management service 51.

Then, in steps S78 and S79, the data obtaining part 302 of the data management service 51 obtains a job list showing jobs associated with the received company code and user identification information from among those that the output data storage part 311 of the data storage service 52 stores.

Then, in steps S80 and S81, the data management service 51 transmits the obtained job list to the image forming apparatus 13 via the access control service 54.

Then, in a case where the image forming apparatus 13 has received a selection of a job from among the obtained job list and a preview display request for the selected job from a user, the image forming apparatus 13 proceeds to steps S82 to S88.

Then, in steps S82 and S83, the job obtaining request part 73 of the image forming apparatus 13 sends a preview obtaining request for the selected job to the access control service 54.

Then, in steps S84 and S85, the data obtaining part 302 of the data management service 51, which has received the preview obtaining request via the access control service 54, obtains the preview image for the selected job from the preview data storage part 312 of the data storage service 52.

Note that when the preview image for the selected job has not been generated, the data management service 51 can obtain no preview image for the selected job from the preview data storage part 312 of the data storage service 52. The case where the preview image for the selected job has not been generated is a case where the preview determination part 305 has determined that it is not necessary to generate a preview image for the same job in step S31 of FIG. 23, and thus, in step S36, the preview data generation part 343 has generated no preview data for the job.

In this case, the data processing request part 303 of the data management service 51 sends a request to the data processing service 55 to generate a preview image for the job. The data processing service 55 then generates the preview image for the job and causes the data storage service 52 to store it in the preview data storage part 312.

The data obtaining part 302 of the data management service 51 then obtains the preview image for the selected job from the preview data storage part 312 of the data storage service 52.

Then, in steps S86 and S87, the data management service 51 transmits the thus obtained preview image to the image forming apparatus 13 via the access control service 54.

Then, in step S88, the display control part 76 of the image forming apparatus 13 displays the thus obtained preview image on the operation panel 202 or the like.

Then, in step S89, the input information reception part 71 of the image forming apparatus 13 receives a user's operation of requesting that a job from among the job list obtained in step S81 is to be executed.

Then, in steps S90 and S91, the job obtaining request part 73 of the image forming apparatus 13 sends a request to obtain the job to be executed from the data management service 51 via the access control service 54.

Then, in steps S92 and S93, the data obtaining part 302 of the data management service 51 obtains the job to be executed (actually, the output data such as the print data in the job, in this case) from the output data storage part 311 of the data storage service 52.

Then, in steps S94 and S95, the data management service 51 transmits the thus obtained job to the image forming apparatus 13 via the access control service 55.

Then, in step S96, the output part 74 of the image forming apparatus 13 executes the thus received job (i.e., for example, prints the print data in the job).

After the execution of the job in step S96 has been competed, the history information transmission part 75 of the image forming apparatus 13 transmits the history information (including the history indicating whether a preview display has been carried out) concerning the executed job to the data management service 51, in steps S97 and S98.

Then, in step S99, the data recording part 301 of the data management service 51 causes the data storage service 52 to store the thus received history information in a manner of associating it with the corresponding company code.

Thus, the processes in FIG. 25 are finished.

<<Login Process from Image Forming Apparatus 13>>

Figure 26:
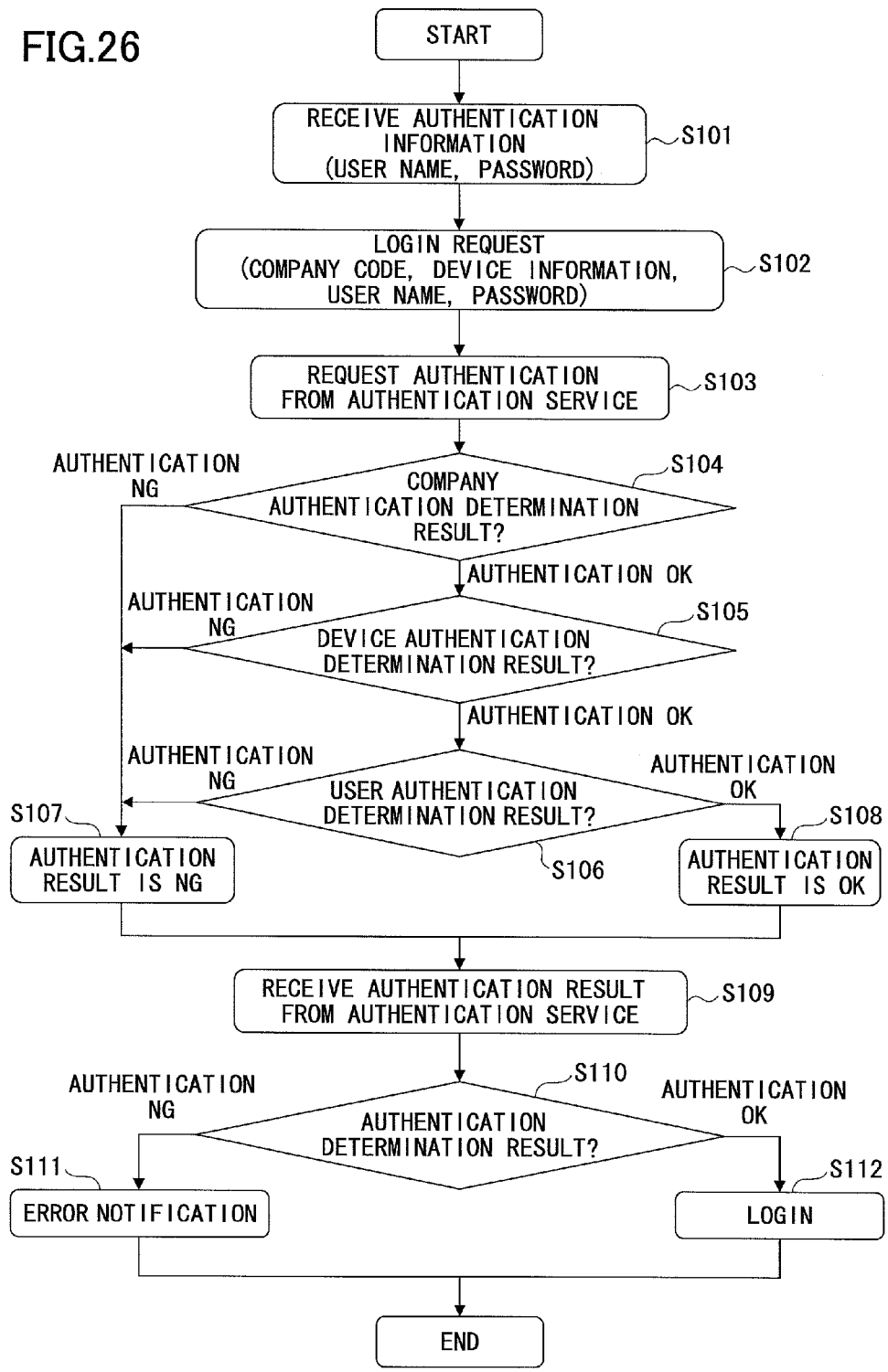
FIG. 26 is a flowchart in one example showing a login procedure from the image forming apparatus.

The image forming apparatus 13 carries out a login process as shown in FIG. 26. FIG. 26 is a flowchart in one example showing a login procedure carried out by the image forming apparatus 13.

In step S101, the image forming apparatus 13 receives an input of authentication information (a user name and a password) from a user. For this purpose, the user may input the authentication information using the operation panel 202 or use an IC card from which the authentication information is to be read by the image forming apparatus 13. Further, the user may also use biological information such as a fingerprint, a voiceprint, a vein and/or the like as the authentication information.

Then, in step S102, the image forming apparatus 13 sends, to the access control service 54, a login request to log into the data management service 51, based on the authentication information that includes the user name and password received from the user, and also, the company code and the device information (such as information for identifying the image forming apparatus 13, or information for identifying an application(s) mounted in the image forming apparatus 13).

Then, in step S103, the access control service 54 that has thus received the login request transmits the authentication information included in the login request to the authentication service 53, and sends an authentication request to the authentication service 53.

Then, in step S104, the authentication service 54 carries out a company authentication determination process based on the company code included in the received authentication information and the company codes included in the company and device information included in the management data.

When the company authentication determination process has resulted in success (OK), the authentication service 53 proceeds to step S105. In step S105, the authentication service 54 carries out a device authentication determination process based on the device information included in the received authentication information and the device information included in the company and device information included in the management data.

When the device authentication determination process has resulted in success (OK), the authentication service 53 proceeds to step S106. In step S106, the authentication service 54 carries out a user authentication determination process based on the user name and password included in the received authentication information and the user name and password of the user information included in the management data associated with the authenticated company code.

When the user authentication determination process has resulted in success (OK), the authentication service 53 proceeds to step S108. In step S108, the authentication service 54 returns the authentication result indicating that the authentication has resulted in success ("authentication result is OK") to the access control service 54. Then, the process proceeds to step S109.

On the other hand, in a case where the company authentication in step S104 has resulted in failure (NG), the device authentication in step S105 has resulted in failure (NG) or the user authentication in step S106 has resulted in failure (NG), the authentication service 53 proceeds to step S107. In step S107, the authentication service 54 returns the authentication result indicating that the authentication has resulted in failure ("authentication result is NG") to the access control service 54. Then, the process proceeds to step S109.

In step S109, the access control service 54 receives the authentication result from the authentication service 53.

Then, in step S110, the access control service 54 determines the received authentication result.

Then, when the authentication result indicates the authentication failure (NG), the access control service proceeds to step S111. In step S111, the access control service 54 transmits an error notification indicating not to approve the login request to the image forming apparatus 13.

On the other hand, when the authentication result indicates the authentication success (OK), the access control service proceeds to step S112. In step S112, the access control service 54 transmits a login response indicating to approve the login request to the image forming apparatus 13.

Thus, the processes in FIG. 26 are finished.

<Summary of Third Embodiment>

Thus, according to the printing system 3 in the third embodiment, it is possible to obtain the same advantageous effects as those of the printing system 1 according to the first embodiment even when a service providing system that provides a service such as that typified by a cloud service is used.

Thus, according to the first, second and third embodiments described above, it is possible to provide the information processing apparatuses, output systems and non-transitory computer readable information recording media, by each of which it is possible to easily realize an increase in speed of a preview display.

Although the information processing apparatuses, output systems and non-transitory computer readable information recording media have been described by the embodiments, the present invention is not limited to these specifically disclosed embodiments, and variations and modifications may be made without departing from the scope of the present invention.

For example, the image forming apparatus 13 according to each embodiment is not limited to an apparatus that has a printing function such as a printer, MFP or the like, and may be an apparatus that carries out image processing, such as a projection apparatus such a projector, an apparatus that displays image data, or the like.

The present patent application is based on and claims the benefit of priority of Japanese Priority Application No. 2012-204048 filed on Sep. 18, 2012, the entire contents of which are hereby incorporated herein by reference.

What is claimed is:

1. An information processing apparatus comprising:
a storing part that stores a set of output data that has been input in a storage part;
an analysis part that analyzes the set of output data that has been input to obtain an attribute value of an output attribute;
a determination part that determines whether to generate a preview image of the set of output data based on the attribute value of the output attribute of the set of output data at a time of storing the set of output data in the storage part;
a preview image generation part that generates the preview image of the set of output data, and
a display control part that, based on a preview display request for the set of output data that is stored in the storage part,
obtains, from a preview image storage part, a preview image of a set of output data for which a preview display is to be carried out, and carries out the preview display of the set of output data for which the preview display is to be carried out on a display part using the obtained preview image, when the preview image of the set of output data for which a preview display is to be carried out has been stored in the preview image storage part, and
causes the preview image generation part to generate the preview image of the set of output data for which the preview display is to be carried out, and carries out the preview display of the set of output data for which the preview display is to be carried out on the display part using the generated preview image, when the preview image of the set of output data for which the preview display is to be carried out has not been stored in the preview image storage part,
wherein, when the determination arts determines that the preview image of the set of output data is to be generated, the preview image generation part generates the preview image of the set of output data and stores the preview image in the preview image storage part at the time of storing the set of output data in the storage part.

2. The information processing apparatus as claimed in claim 1, wherein
the determination part obtains, based on the attribute value of the output attribute of the set of output data that has been input and history information that associates the attribute values of the output attribute of sets of output data with information concerning preview displays of the sets of output data, the number of times or a ratio of preview displays of sets of output data, wherein
the determination part obtains the number of times or the ratio of preview displays of sets of output data from information concerning preview displays of sets of output data, which information is included in the history information and is associated with the attribute value of the output attribute of the set of output data that has been input, and the determination part determines whether to generate a preview image of the set of output data that has been input, based on a relationship of the number of times or the ratio of preview displays of sets of output data obtained for the attribute value of the output attribute of the set of output data that has been input with a threshold.

3. The information processing apparatus as claimed in claim 2, further comprising a history management part that, after a preview display of a set of output data has been carried out on a display part, adds a record of the preview display of the set of output data to information concerning preview displays of sets of output data, included in the history information, associated with the attribute value of the output attribute of the set of output data.

4. The information processing apparatus as claimed in claim 3, wherein the history management part receives, from a user, a selection of one or more of the output attributes to be used to determine whether to generate a preview image of a set of output data.

5. The information processing apparatus as claimed in claim 3, wherein the history management part receives, from a user, a selection of a period of time for which the history information is to be stored or a selection of an upper limit of an amount of the history information to be stored.

6. The information processing apparatus as claimed in claim 2, further comprising a history management part that, after a preview display of a set of output data has been carried out on a display part, adds a record of the preview display of the set of output data, wherein the history management part adds the record of the preview display of the set of output data to information concerning preview displays of sets of output data, which information is included in the history information and is associated with the attribute value of the output attribute of the set of output data, and the history management part receives, from a user, a setting of the threshold.

7. An output system comprising:

a system that includes one or more information processing apparatuses; and an output apparatus, wherein the system and the output apparatus are connected by a network in such a manner that the system and the output apparatus can communicate with one another, wherein the output system functions as a storing part that stores a set of output data that has been input in a storage part;

an analysis part that analyzes the set of output data that has been input to obtain an attribute value of an output attribute;

a determination part that determines whether to generate a preview image of the set of output data based on the attribute value of the output attribute of the set of output data at a time of storing the set of output data in the storage part;

a preview image generation part that generates the preview image of the set of output data, and a display control part that, based on a preview display request for the set of output data that is stored in the storage part, obtains, from a preview image storage part, a preview image of a set of output data for which a preview display is to be carried out, and carries out the preview display of the set of output data for which the preview display is to be carried out on a display part using the obtained preview image, when the preview image of the set of output data for which a preview display is to be carried out has been stored in the preview image storage part, and causes the preview image generation part to generate the preview image of the set of output data for which the preview display is to be carried out, and carries out the preview display of the set of output data for which the preview display is to be carried out on the display part using the generated preview image, when the preview image of the set of output data for which the preview display is to be carried out has not been stored in the preview image storage part, wherein, when the determination parts determines that the preview image of the set of output data is to be generated, the preview image generation part generates the preview image of the set of output data and stores the preview image in the preview image storage part at the time of storing the set of output data in the storage part.

8. The output system as claimed in claim 7, wherein the determination part obtains, based the attribute value of the output attribute of the set of output data that has been input and history information that associates the attribute values of the output attribute of sets of output data with information concerning preview displays of the sets of output data, the number of times or a ratio of preview displays of sets of output data, wherein the determination part obtains the number of times or the ratio of preview displays of sets of output data from information concerning preview displays of sets of output data, which information is included in the history information and is associated with the attribute value of the output attribute of the set of output data that has been input, and the determination part determines whether to generate a preview image of the set of output data that has been input, based on a relationship of the number of times or the ratio of preview displays of sets of output data obtained for the attribute value of the output attribute of the set of output data that has been input with a threshold.

9. The output system as claimed in claim 8, further functioning as a history management part that, after a preview display of a set of output data has been carried out on a display part, adds a record of the preview display of the set of output data to information concerning preview displays of sets of output data, included in the history information, associated with the attribute value of the output attribute of the set of output data.

10. The output system as claimed in claim 9, wherein the history management part receives, from a user, a selection of one or more of the output attributes to be used to determine whether to generate a preview image of a set of output data.

11. The output system as claimed in claim 9, wherein
the history management part receives, from a user, a selection of a period of time for which the history information is to be stored or a selection of an upper limit of an amount of the history information to be stored.

12. The output system as claimed in claim 8, further functioning as
a history management part that, after a preview display of a set of output data has been carried out on a display part, adds a record of the preview display of the set of output data, wherein
the history management part adds the record of the preview display of the set of output data to information concerning preview displays of sets of output data, which information is included in the history information and is associated with the attribute value of the output attribute of the set of output data, and
the history management part receives, from a user, a setting of the threshold.

13. A non-transitory computer readable information recording medium storing a program which, when executed by one or more processors, causes the one or more processors to perform:
storing a set of output data that has been input in a storage part;
analyzing the set of output data that has been input to obtain an attribute value of an output attribute;
determining whether to generate a preview image of the set of output data based on the attribute value of the output attribute of the set of output data at a time of storing the set of output data in the storage part; and
generating the preview image of the set of output data, and
obtaining, based on a preview display request for the set of output data that is stored in the storage part, from a preview image storage part, a preview image of a set of output data for which a preview display is to be carried out, and carries out the preview display of the set of output data for which the preview display is to be carried out on a display part using the obtained preview image, when the preview image of the set of output data for which a preview display is to be carried out has been stored in the preview image storage part, and
generating, based on a preview display request for the set of output data that is stored in the storage part, the preview image of the set of output data for which the preview display is to be carried out, and carrying out the preview display of the set of output data for which the preview display is to be carried out on the display part using the generated preview image, when the preview image of the set of output data for which the preview display is to be carried out has not been stored in the preview image storage part,
wherein, when it is determined that the preview image of the set of output data is to be generated, the preview image of the set of output data is generated and stored in the preview image storage part at the time of storing the set of output data in the storage part.

14. The non-transitory computer readable information recording medium as claimed in claim 13, wherein
the determining obtains, based on the attribute value of the output attribute of the set of output data that has been input and history information that associates the attribute values of the output attribute of sets of output data with information concerning preview displays of the sets of output data, the number of times or a ratio of preview displays of sets of output data, wherein
the determining obtains the number of times or the ratio of preview displays of sets of output data from information concerning preview displays of sets of output data, which information is included in the history information and is associated with the attribute value of the output attribute of the set of output data that has been input, and
the determining determines whether to generate a preview image of the set of output data that has been input, based on a relationship of the number of times or the ratio of preview displays of sets of output data obtained for the attribute value of the output attribute of the set of output data that has been input with a threshold.

15. The information processing apparatus as claimed in claim 14, wherein the one or more processors further perform:
adding, after a preview display of a set of output data has been carried out on a display part, a record of the preview display of the set of output data to information concerning preview displays of sets of output data, included in the history information, associated with the attribute value of the output attribute of the set of output data.

16. The information processing apparatus as claimed in claim 15, wherein the one or more processors further perform receiving, from a user, a selection of one or more of the output attributes to be used to determine whether to generate a preview image of a set of output data.

17. The information processing apparatus as claimed in claim 15, wherein the one or more processors further perform receiving, from a user, a selection of a period of time for which the history information is to be stored or a selection of an upper limit of an amount of the history information to be stored.

18. The information processing apparatus as claimed in claim 14, wherein the one or more processors further perform:
adding, after a preview display of a set of output data has been carried out on a display part, a record of the preview display of the set of output data, wherein
the adding adds the record of the preview display of the set of output data to information concerning preview displays of sets of output data, which information is included in the history information and is associated with the attribute value of the output attribute of the set of output data, and
receiving, from a user, a setting of the threshold.

* * * * *